(12) United States Patent
Dehkordi et al.

(10) Patent No.: US 12,025,798 B1
(45) Date of Patent: Jul. 2, 2024

(54) MULTIPURPOSE IN-VEHICLE DISPLAY SYSTEMS WITH AMBIENT LIGHT SOURCES FOR INTEGRATED HUDS, INSTRUMENT CLUSTERS, AND INTERACTIVE DISPLAYS

(71) Applicant: Brelyon, Inc., San Mateo, CA (US)

(72) Inventors: Barmak Heshmat Dehkordi, San Mateo, CA (US); Christopher Barsi, Lee, NH (US); Albert Redo Sanchez, San Mateo, CA (US)

(73) Assignee: BRELYON, INC., San Mateo, CA (US)

( * ) Notice: Subject to any disclaimer, the term of this patent is extended or adjusted under 35 U.S.C. 154(b) by 0 days.

(21) Appl. No.: 18/465,396

(22) Filed: Sep. 12, 2023

(51) Int. Cl.
*G02B 27/01* (2006.01)
*B60K 35/00* (2024.01)
*B60K 35/10* (2024.01)
*B60K 35/23* (2024.01)
*B60K 35/40* (2024.01)

(52) U.S. Cl.
CPC .......... *G02B 27/0101* (2013.01); *B60K 35/00* (2013.01); *B60K 35/10* (2024.01); *B60K 35/23* (2024.01); *B60K 35/425* (2024.01); *B60K 2360/146* (2024.01); *B60K 2360/21* (2024.01); *B60K 2360/23* (2024.01); *B60K 2360/25* (2024.01); *B60K 2360/31* (2024.01); *G02B 2027/0118* (2013.01)

(58) Field of Classification Search
CPC ... G02B 27/01–0189; G02B 2027/0105–0198; B60K 35/00–90; B60K 2360/00–96
See application file for complete search history.

(56) References Cited

U.S. PATENT DOCUMENTS

| | | | |
|---|---|---|---|
| 2016/0209647 A1* | 7/2016 | Fürsich | G02B 27/0075 |
| 2017/0315352 A1* | 11/2017 | Hardy | G02B 26/0833 |
| 2021/0373331 A1* | 12/2021 | Gu | G02F 1/0136 |

* cited by examiner

*Primary Examiner* — Bao-Luan Q Le
*Assistant Examiner* — Christopher A Lamb, II
(74) *Attorney, Agent, or Firm* — Hsuanyeh Law Group, PC

(57) ABSTRACT

In some embodiments, a display system comprises a set of reflective or semi-reflective elements. A display emits light such that one portion of the light travels a first path through the display system, and another portion travels a second path, which includes a reflection from a windshield. The two portions form virtual images that are simultaneously viewable in a headbox. In some embodiments, the source of light that forms the image is an ambient source, and the display system is at least in part a sunlight-driven display system. In some embodiments, virtual images have a monocular depth that is far from a viewer. In some embodiments, the virtual images are closer to a viewer, and a gesture camera captures information about gestures made by a viewer, said gestures modifying the virtual images or some property or dynamics of the vehicle.

26 Claims, 18 Drawing Sheets

30 QBQ

31 QM

32 Electro-optic shutter

33 Electro-optic reflector

34 Full switchable black mirror (FSBM)

35 Full switchable black mirror with quarter waveplate (FSBMQ)

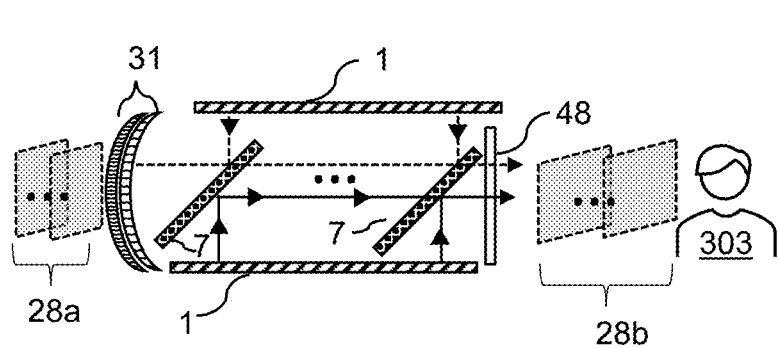 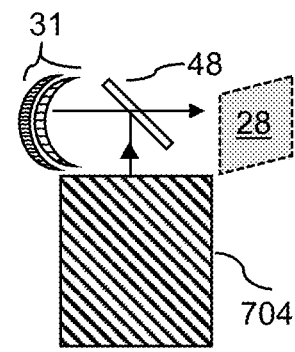
FIG. 7E FIG. 7F
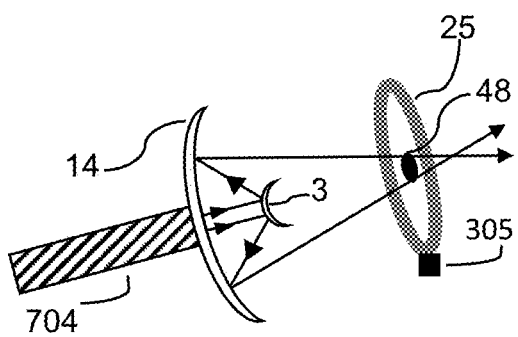 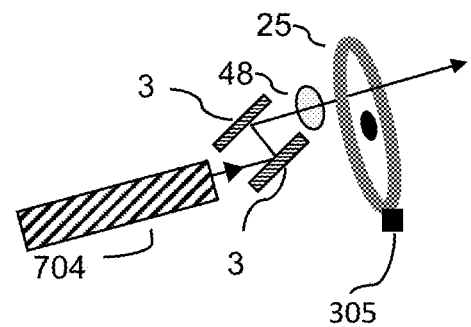
FIG. 7G FIG. 7H
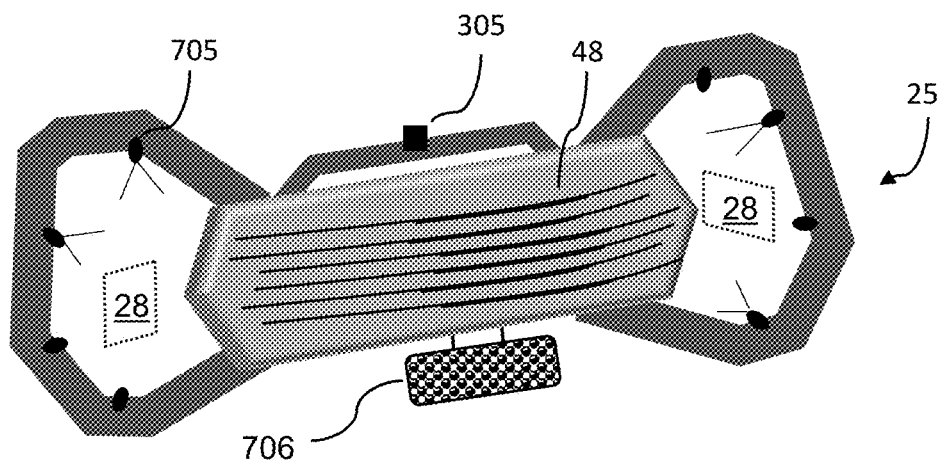
FIG. 7I

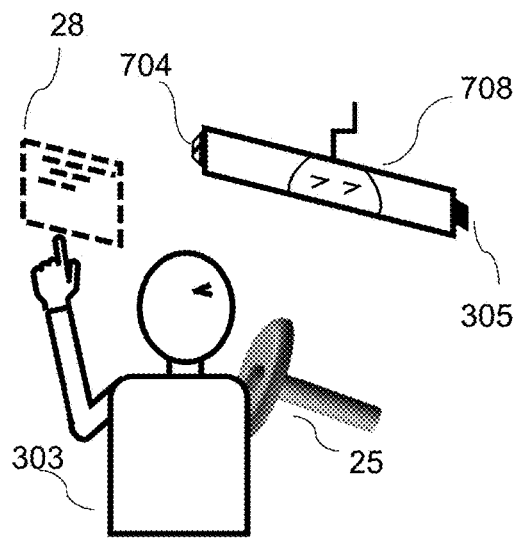
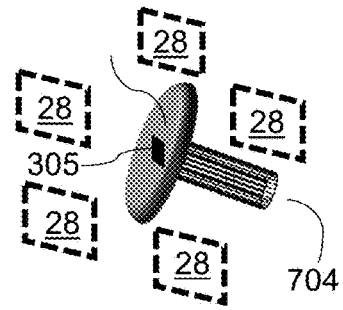
FIG. 8A
FIG. 8B
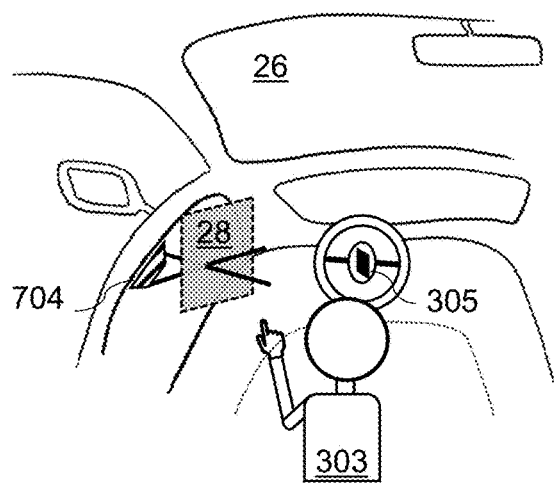
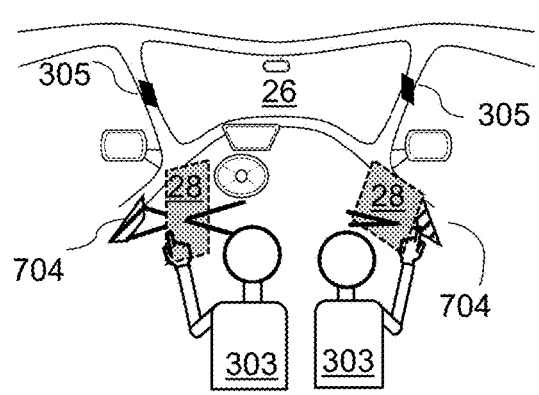
FIG. 8C
FIG. 8D

MULTIPURPOSE IN-VEHICLE DISPLAY SYSTEMS WITH AMBIENT LIGHT SOURCES FOR INTEGRATED HUDS, INSTRUMENT CLUSTERS, AND INTERACTIVE DISPLAYS

FIELD OF THE INVENTION

The present invention relates to virtual display systems, in particular virtual display systems integrated into a vehicle, wherein a light source produces virtual images or multifocal images for a driver or passenger, the light source being either part of the integrated system or coming from the external environment.

BACKGROUND OF THE INVENTION

In today's society, there has been increasing movement towards more immersive lightfield and/or autostereoscopic three-dimensional (3D) displays due to advancement in electronics and microfabrication. 3D display technologies, such as virtual reality (VR) and augmented reality (AR) headsets, are often interested in presenting to a viewer an image that is perceived at a depth far behind the display device itself. A series of refractive elements can produce such an image, though at the expense of increased bulk and potential optical aberrations. Further, many such displays cause eye strain, nausea, or other symptoms of fatigue.

Virtual display systems are designed and implemented with various specifications. For example, in U.S. Pat. No. 11,067,825 B2 and U.S. Pat. No. 11,768,825 B1, Dehkordi described a virtual display system providing monocular and binocular depth cues to achieve realistic depth perception effects. In U.S. Pat. No. 11,592,684 B2, Dehkordi disclosed an optical component called a field evolving cavity, which folds light back and forth for multiple round trips with the cavity, to make the light source appear farther from the viewer compared to the distance to the physical display system. In U.S. Pat. No. 11,196,976 B2, Dehkordi further disclosed a virtual display system directed to tessellating a light field into a size or depth that is extended beyond the pupil size of a display system. In U.S. Pat. No. 11,662,591 B1, Dehkordi et al disclosed an apparatus for modifying the monocular depth of virtual images dynamically and for producing a multifocal virtual image. Last, in U.S. Pat. No. 11,320,668 B2, Dehkordi et al disclosed a method of modifying the optical quality or the properties of a display system using optical fusion, which combines computational methods with optical architectures to remove visual artifacts from the images produced by the display system.

SUMMARY OF THE INVENTION

Head-up displays (HUDs) in vehicles allow drivers to engage with vital information while driving without having to change their eye gaze direction. By projecting data like speed, navigation directions, and incoming calls onto the windshield or a dedicated screen, HUDs enable drivers to access crucial details without shifting their focus from the road. This technology enhances safety by minimizing driver distraction and promoting better situational awareness. Other types of display systems may be used for passenger entertainment, or for interaction through interactive displays.

In some embodiments, integrated visualization systems produce HUD images, after reflection by a vehicular windshield, as well as other virtual images that are simultaneously viewable by a viewer, including a driver of a vehicle, interaction with a windshield. Some of these virtual images are multifocal images. Some of these virtual images have a monocular depth that is farther away from the viewer than a component of the display system itself. Others have a monocular depth that is closer. Such closer images, called hovering real image, may be modified by information captured by a gesture camera that is monitoring the gestures of a viewer or other passengers.

In some embodiments, the source light of the image is ambient light external to the vehicle. Ambient light includes environmental light, such as that received directly or indirectly from the sun. In some embodiments, electronic circuitry measures the ambient light and provides signaling to the display system to use the ambient light or, if the ambient light is too dim or unsteady, to use an integrated backlight or display panel.

BRIEF DESCRIPTION OF THE DRAWINGS

FIGS. 8A through 8D depict various configurations of hovering-real-image display systems integrated in various parts of a vehicle.

DETAILED DESCRIPTION OF THE INVENTION

Figure 1:
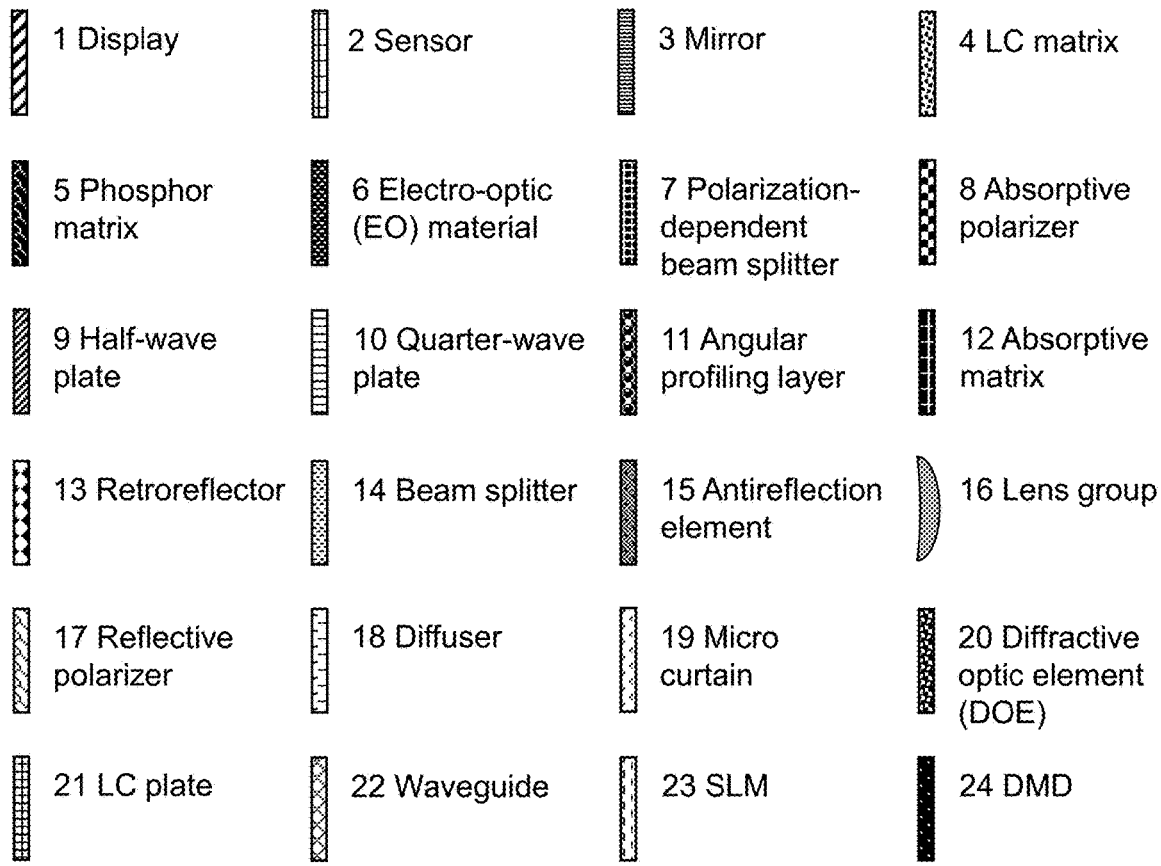
FIG. 1 shows a list of commonly used elements throughout this disclosure.
Figure 1:
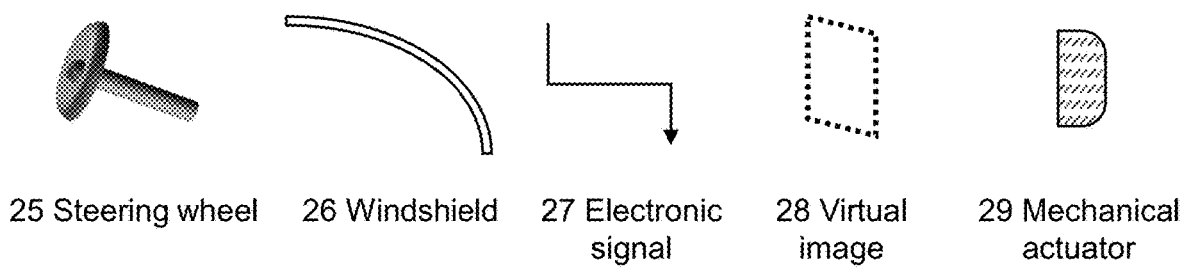

In this description, references to an "embodiment," "one embodiment," or similar words or phrases mean that the feature, function, structure, or characteristic being described is an example of the technique or invention introduced here. Occurrences of such phrases in this specification do not necessarily all refer to the same embodiment. On the other hand, the embodiments referred to herein also are not necessarily mutually exclusive. All references to "user," "users," "observer," or "viewer," pertain to either individual or individuals who would use the technique introduced here. All illustrations and drawings describe selected versions of the present invention and are not intended to limit the scope of the present invention.

Additionally, throughout this disclosure, the term "arbitrarily engineered" refers to being of any shape, size, material, feature, type or kind, orientation, location, quantity, components, and arrangements of single components or arrays of components that would allow the present invention, or that specific component or array of components, to fulfill the objectives and intents of the present invention, or of that specific component or array of components, within the invention.

As used herein, the term "optically coupled" refers to two elements, the first element being adapted to impart, transfer, feed, or direct light to the second element directly or indirectly.

In this disclosure, the "lightfield" at a plane refers to a vector field that describes the amount of light flowing in every or several selected directions through every point in that plane. The lightfield is the description of the angles and intensities of light rays traveling through or emitted from that plane. Further, a "fractional lightfield" refers to a subsampled version of the lightfield such that full lightfield vector field is represented by a finite number of samples in different focal planes and/or angles.

"Monocular optical depth" or "monocular depth" is the perceived distance, or apparent depth, between the observer and the apparent position of an image. It equals the distance to which an eye accommodates (focuses) to see a clear image. Thus, the monocular depth is the accommodation depth corresponding to the accommodation depth cue. Each eye separately experiences this depth cue.

For example, a point source of light emits light rays equally in all directions, and the tips of these light rays can be visualized as all lying on a spherical surface, called a wavefront, of expanding radius. (In geometric optics in, for example, free space or isotropic media, the wavefront is identical the surface that is everywhere perpendicular to the light rays.) When the point source is moved farther from an observer, emitted light rays travel a longer distance to reach the observer and therefore their tips lie on a spherical wavefront of larger radius and correspondingly smaller curvature, i.e., the wavefront is flatter. This flatter wavefront is focused by an eye differently than a less flat one. Consequently, the point source is perceived by an eye or a camera as a farther distance, or deeper depth, to the object. Monocular optical depth does not require both eyes, or stereopsis, to be perceived. An extended object can be considered as a collection of ideal point sources at varying positions and as consequently emitting a wavefront corresponding to the sum of the point-source wavefronts, so the same principles apply to, e.g., an illuminated object or emissive display panel. Evolution of a wavefront refers to changes in wavefront curvature due to optical propagation.

In this disclosure, "depth modulation" refers to the change, programming, or variation of monocular optical depth of the display or image.

In this disclosure, the term "display" refers to an "emissive display," which can be based on any technology, including, but not limited to, display panels likes liquid crystal displays (LCD), thin-film transistor (TFT), light emitting diode (LED), organic light emitting diode arrays (OLED), active matrix organic light emitting diode (AMOLED), plastic organic light emitting diode (POLED), micro organic light emitting diode (MOLED), or projection or angular-projection arrays on flat screens or angle-dependent diffusive screens or any other display technology and/or mirrors and/or half-mirrors and/or switchable mirrors or liquid crystal sheets arranged and assembled in such a way as to exit bundles of light with a divergence apex at different depths or one depth from the core plane or waveguide-based displays. The display may be an autostereoscopic display that provides stereoscopic depth with or without glasses. It might be curved, flat, or bent; or comprise an array of smaller displays tiled together in an arbitrary configuration. The display may be a near-eye display for a headset, a near-head display, or far-standing display. The application of the display does not impact the principle of this invention.

A "segmented display" is a display in which different portions of the display show different display contents, i.e., a first portion of light from the segmented display corresponds to an independent display content compared to a second portion of light from the segmented display. In some embodiments, the light corresponding to each display content travels a different path through an optical system to produce correspondingly different virtual images. The virtual images may be at different monocular depths. Each display content is called a "segment." In some embodiments, the different segments show identical content that are made to overlap to enhance brightness or another property of the image quality.

A display system that produces a virtual image may be called a virtual display system. A virtual image is meant to be viewed by an observer, rather than be projected directly onto a screen. The light forming the image has traveled an optical distance corresponding to the monocular depth at which a viewer perceives the image. That is, the monocular depth is the depth at which the viewers' eyes accommodate (focus to). The geometric plane in space in which the virtual image is located is called the "focal plane." A virtual image comprising a set of virtual images at different focal planes is called a multifocal image. A virtual image whose focal plane can be adjusted dynamically, e.g., by varying an optical or electrical property of the display system, is also called a multifocal image. A virtual display system that produces multifocal images may be called a "multifocal display system."

In some embodiments, the display system produces a real image in the space outside the display system. (A real image forms where the light rays physical intersect, such that a film placed at that location will record a (collection of) bright spot(s), corresponding to an image. The light rays diverge beyond that intersection point, such that a viewer sees a virtual image. That virtual image is first formed as a real image and will appear to the viewer as floating, or hovering, in front of the display panel, at the location of the real image location. Such an image is called a "hovering real image."

An "instrument cluster" is a display for a vehicle that provides visual information about the status of the vehicle. In automobile, an instrument cluster may show a speedometer, odometer, tachometer, fuel gauge, temperature gauge, battery charge level, warning signals, other alerts. In some embodiments in includes GPS or map information for navigation A HUD image is an image that forms overlaid with a transparent window of a vehicle. A HUD image is an example of an AR image, in which the image is overlaid with environmental scenery.

"Headbox" is the volume of space where a viewer's eyes may be positioned for an image to be visible. In some embodiments, the headbox is larger than the average inter-pupillary distance for a person, such that both eyes can be located within the headbox simultaneously. The virtual images disclosed herein are simultaneously visible by both eyes of a view. In some embodiments the headbox is large enough for a plurality of viewers to see a virtual image.

An "addressable matrix" or "pixel matrix" is a transmissive element divided into pixels that can be individually (e.g., electrically) controlled as being "ON," to transmit light, or "OFF," to prevent light from passing, such that a light source passing through can modulated to create an image. The examples of displays above include such matrix elements.

More generally, a "modulation matrix" is an element that is segmented such that light traveling incident on different portions of the modulation matrix experience different optical properties of the modulation matrix, the different optical properties being controllable. Such a layer is used to imprint spatial information, such as an image, onto the light. A modulation matrix may be absorptive, reflective, transmissive, or emissive; and it may comprise electrophoretic, absorptive, fluorescent or phosphorescent, mechanical, birefringent, electrooptic materials. An addressable matrix is an example of a modulation matrix layer. In some embodiments the optical properties of each portion of a modulation matrix depend also on the incident light (e.g., for a photochromic-based modulation matrix).

As used herein, the "display aperture" is the surface where the light exits the display system toward the exit pupil of the display system. The aperture is a physical surface, whereas the exit pupil is an imaginary surface that may or may not be superimposed on the aperture. After the exit pupil, the light enters the outside world.

"Image aperture," "exit aperture optics" or "exit aperture" all correspond interchangeably to a set of optical elements located at the aperture surface. In some embodiments, the set contains only one element, such as a transparent window. Exit aperture optics protect the inside of the display system from external contaminants. Exit aperture optics are also used to prevent unwanted light from entering the display system. In a display system, "stray light" is unwanted light that interacts with the display system and travels along a substantially similar path as the desired image into a viewer's eyes. For example, stray light includes ambient light that enters the system through an undesired entrance and finally exits through the display aperture to be visible by an observer, thus degrading the viewing experience. With exit aperture optics, such stray light prevents or mitigates this degradation by removing stray light or its effects. In some embodiments, exit aperture optics includes a wave plate and a polarizer. In some embodiments, it includes an anti-reflection coating. In the context of stray light mitigation, an exit aperture may also be called an "ambient light suppressor."

As used herein, the "imaging aperture" is the area or surface where the light enters an imaging system after the entrance pupil of the imaging system and propagates toward the sensor. The entrance pupil is an imaginary surface or plane where the light first enters the imaging system.

In display systems that use ambient or environmental light as the light source, the ambient light enters the display system through a set of optics called an "entrance aperture" or, equivalently, "entrance aperture optics." In some embodiments, this set contains only one element, which may be a single transparent element to transmit the ambient light into the display system. Entrance aperture optics is located at the surface where the ambient light enters the display system. In some embodiments, the entrance aperture optics is configured to collect as much light as possible and may include diffractive optic elements, Fresnel lens or surfaces, nanocone or nanopillar arrays, antireflection layers, and the like.

As used herein, the term "chief ray" refers to the central axis of a light cone that is emitted by a pixel source or a point-like source, or that is reflected by a point on an object.

The terms "field evolving cavity" or "FEC" refer to a non-resonant (e.g., unstable) cavity, comprising reflectors or semi-reflectors, that allows light to travel back and forth between those reflectors or semi-reflectors to evolve the shape of the wavefront, therefore the monocular depth, associated with the light in a physical space. One example of an FEC may comprise two or more half-mirrors or semi-transparent mirrors facing each other and separated by a distance d. The light that travels from the first half-mirror, reflected by the second half-mirror, reflected by the first half-mirror, and finally transmitted by the second half-mirror will have traveled a total distance of 2d, which is the monocular depth. Thus, the monocular depth is larger than the length of the FEC.

In some embodiments, an FEC may be parallel to or optically coupled to a display or entrance aperture optics (in the case of display systems that use ambient light as the light source) or to an imaging aperture or imaging aperture (in the case of imaging systems). In some embodiments, an FEC changes the apparent depth of a display or of a section of the display.

In an FEC, the light is reflected back and forth, or is circulated, between the elements of the cavity. Each of these propagations is a pass. For example, suppose there are two reflectors comprising an FEC, one at the light source side and another one at the exit side. The first instance of light propagating from the entrance reflector to the exit reflector is called a forward pass. When the light, or part of light, is reflected from the exit facet back to the entrance facet, that propagation is called a backward pass, as the light is propagating backward toward the light source. In a cavity, a round trip occurs once the light completes one cycle and comes back to the entrance facet. In some embodiments, a round trip occurs when light substantially reverses direction to interact with an element of an optical system more than once. The term "round trips" denotes the number of times that light circulates or bounces back and forth between the two elements of a cavity or the number of times light interacts with a single element.

FECs can have infinitely many different architectures, but the principle is always the same. An FEC is an optical architecture that creates multiple paths for the light to travel, either by forcing the light to make multiple round trips or by forcing the light from different sections of the same display (e.g., a segmented display) to travel different distances before the light exits the cavity. If the light exits the cavity perpendicular to the angle it has entered the cavity, the FEC is referred to as an off-axis FEC or a "FEC with perpendicular emission."

The terms "concentric light field" or "curving light field" as used herein mean a lightfield for which for any two pixels of the display at a fixed radius from the viewer (called "first pixel" and "second pixel"), the chief ray of the light cone emitted from the first pixel in a direction perpendicular to the surface of the display at the first pixel intersects with the chief ray of the light cone emitted from the second pixel in a direction perpendicular to the surface of the display at the second pixel. A concentric lightfield produces an image that is focusable to the eye at all points, including pixels that are far from the optical axis of the system (the center of curvature), where the image is curved rather than flat, and the image is viewable within a specific viewing space (headbox) in front of the lightfield.

Throughout this disclosure, "angular profiling" is the engineering of light rays to travel in specified directions. Angular profiling may be achieved by directional films, holographic optical elements (HOEs), diffractive optical elements (DOEs), lenses, lenslet arrays, microlens arrays, aperture arrays, optical phase masks or amplitude masks, digital mirror devices (DMDs), spatial light modulators (SLMs), metasurfaces, diffraction gratings, interferometric films, privacy films, or other methods.

"Intensity profiling" is the engineering of light rays to have specified values of brightness. It may be achieved by absorptive or reflective polarizers, absorptive coatings, gradient coatings, or other methods.

The color or "wavelength profiling" is the engineering of light rays to have specified colors, or wavelengths. It may be achieved by color filters, absorptive notch filters, interference thin films, or other methods.

"Polarization profiling" is the engineering of light rays to have specified polarizations. It might be achieved by metasurfaces with metallic or dielectric materials, micro- or nanostructures, wire grids or other reflective polarizers, absorptive polarizers, quarter-wave plates, half-wave plates, 1/x waveplates, or other nonlinear crystals with an anisotropy, or spatially profiled waveplates. All such components can be arbitrarily engineered to deliver the desired profile.

"Distortion compensation" is a technique for compensating errors in an optical system that would otherwise degrade image quality. In some embodiments, the distortion compensation is computational. The desired image content is pre-distorted such that when it experiences a physical distortion, the effect is negated, and the result is a clear image. Distortions to compensate include aberrations, angular variations of reflections. For example, a birefringent or anisotropic element may be added to account for a angle-dependent response of a wave plate. Such elements are called compensators or C-plates As used herein, "arbitrary optical parameter variation" refers to variations, changes, modulations, programing, and/or control of parameters, which can be one or a collection of the following variations: optical zoom change, aperture size or brightness variation, focus variation, aberration variation, focal length variation, time-of-flight or phase variation (in the case of an imaging system with a time-sensitive or phase-sensitive imaging sensor), color or spectral variation (in the case of a spectrum-sensitive sensor), angular variation of the captured image, variation in depth of field, variation of depth of focus, variation of coma, or variation of stereopsis baseline (in the case of stereoscopic acquisition).

Throughout this disclosure, the terms "active design," "active components," or, generally, "active" refer to a design or a component that has variable optical properties that can be changed with an optical, electrical, magnetic, or acoustic signal. Electro-optical (EO) materials include liquid crystals (LC); liquid crystal as variable retarder (LCVR); or piezoelectric materials/layers exhibiting Pockel's effects (also known as electro-optical refractive index variation), such as lithium niobate ($LiNbO_3$), lithium tantalate ($LiTaO_3$), potassium titanyl phosphate (KTP), strontium barium niobate (SBN), and β-barium borate (BBO), with transparent electrodes on both sides to introduce electric fields to change the refractive index. The EO material can be arbitrarily engineered. Conversely, "passive designs" or "passive components" refer to designs that do not have any active component other than the display.

Throughout this disclosure the "pass angle" of a polarizer is the angle at which the incident light normally incident to the surface of the polarizer can pass through the polarizer with maximum intensity.

Throughout this disclosure, a "reflective polarizer" is a polarizer that allows the light that has its polarization aligned with the pass angle of the polarizer to transmit through the polarizer and that reflects the light that is cross polarized with its pass axis. A "wire grid polarizer" (a reflective polarizer made with nano wires aligned in parallel) is a non-limiting example of such a polarizer.

An "absorptive polarizer" is a polarizer that allows the light with polarization aligned with the pass angle of the polarizer to pass through and that absorbs the cross polarized light.

Two items that are "cross polarized," are such that their polarization statuses or orientations are orthogonal to each other. For example, when two linear polarizers are cross polarized, their pass angles differ by 90 degrees.

A "beam splitter" is a semi-reflective element that reflects a certain desired percentage of the intensity and transmits the rest of the intensity. The percentage can be dependent on the polarization. A simple example of a beam splitter is a glass slab with a semi-transparent silver coating or dielectric coating on it, such that it allows 50% of the light to pass through it and reflects the other 50%.

Throughout this disclosure, the "imaging sensor" may use "arbitrary image sensing technologies" to capture light or a certain parameter of light that is exposed onto it. Examples of such arbitrary image sensing technologies include complementary-symmetry metal-oxide-semiconductor (CMOS), single photon avalanche diode (SPAD) array, charge-coupled Device (CCD), intensified charge-coupled device (ICCD), ultra-fast streak sensor, time-of-flight sensor (ToF), Schottky diodes, or any other light or electromagnetic sensing mechanism for shorter or longer wavelengths.

Throughout this disclosure, the term "GRIN material," or "GRIN slab," refers to a material that possesses a graded refractive index, which is an arbitrarily engineered material that shows a variable index of refraction along a desired direction. The variation of the refractive index, direction of its variation, and its dependency with respect to the polarization or wavelength of the light can be arbitrarily engineered.

Throughout this disclosure, the term "quantum dot" (QD), or "quantum-dot layer," refers to a light source, or an element containing a plurality of such light sources, which are based on the absorption and emission of light from nanoparticles in which the emission process is dominated by quantum mechanical effects. These particles are a few nanometers in size, and they are often made of II-IV semiconductor materials, such as cadmium sulfide (CdS), cadmium telluride (CdTe), indium arsenide (InAs), or indium phosphide (InP). When excited by ultraviolet light, an electron in the quantum dot is excited from its valence band to its conduction band and then re-emits light as it falls to the lower energy level.

The "optic axis" or "optical axis" of a display (imaging) system is an imaginary line between the light source and the viewer (sensor) that is perpendicular to the surface of the aperture or image plane. It corresponds to the path of least geometric deviation of a light ray.

Throughout this disclosure, "transverse invariance" or "transversely invariant" are terms that refer to a property that does not vary macroscopically along a dimension that is perpendicular to the optic axis of that element. A transversely invariant structure or surface does not have any axis of symmetry in its optical properties in macro scale.

As used herein, "imaging system" refers to any apparatus that captures an image, which is a matrix of information about light intensity, phase, temporal character, spectral character, polarization, entanglement, or other properties used in any application or framework. Imaging systems include cellphone cameras, industrial cameras, photography or videography cameras, microscopes, telescopes, spectrometers, time-of-flight cameras, ultrafast cameras, thermal cameras, or any other type of imaging system. In some embodiments, the gesture that is output can be used to execute a command in a computer system connected, wireless or by hardwire, to the gesture camera.

A "gesture camera" is a camera that captures an image of a person and subsequently computationally infers gestures or poses that the person makes in the image. The gesture camera may comprise a conventional camera, a stereoscopic two-camera system or array of cameras, or a time-of-flight camera. In some embodiments machine learning is used to infer the gestures. In some embodiments, features are extracted from the image, such as object detection or image segmentation to assist in the gesture camera's function. In some embodiments, the physical gesture made by the person is compared to a library or a dictionary of gestures available to the computational module and software associated with the gesture camera. The library or dictionary is a dataset of labeled gestures that has been used to train the machine learning algorithm.

The "light efficiency" or "optical efficiency" is the ratio of the light energy the reaches the viewer to the light energy emitted by an initial display.

This disclosure extends previous methods display systems which produce a single, continuous lightfield that enables simultaneous detection of monocular depth by each eye of a viewer who is positioned within the intended viewing region, where both the monocular depth can be greater than the physical distance between the display and the viewer, and where the apparent size of the display (as perceived by the viewer) is larger or smaller than the physical size of the display.

The methods in this disclosure can be used in arbitrarily engineered displays. These include, but are not limited to, large-scale lightfield displays that doesn't require glasses, systems that do require glasses, display systems that curve in front of the face and are closer to the user, lightfield displays with fractional lightfield, any type of head-mounted displays such as AR displays, mixed reality (MR) displays, VR displays, and both monocular and multifocal displays.

Further, the methods in this disclosure can be used in arbitrarily engineered imaging systems, including, but not limited to, microscopes, endoscopes, hyperspectral imaging systems, time-of-flight imaging systems, telescopes, remote imaging systems, scientific imaging systems, spectrometers, and satellite imagery cameras.

The elements of the embodiments for this invention are shown in FIG. 1. The components can be engineered arbitrarily.

Element 1 is the schematic representation of a display. In some embodiments, the display is a volumetric display. In some embodiments the display is a backlight or broadband light source that is optically coupled to a modulation matrix.

Element 2 is the representation of a sensor, which can be an optical sensor, a camera sensor, an electronic sensor, or a motion sensor. In some embodiments, the sensor is an ambient-light sensor to measure the amount of ambient light present and output a corresponding electronic signal. An ambient light sensor may be a photodiode, a power meter, an imaging sensor, and the like.

Element 3 is a mirror, which can be a first-surface mirror, or second-surface mirror, or generally any reflective surface. Mirrors may be curved or flat.

Generally, both mirrors and beam splitters, or semi-reflective elements, are used to direct light along a proscribed path in a display system. Both rely on specular reflection because their surfaces are smooth on the order of a wavelength. The term "specular reflector" therefore refers to both mirrors and beam splitters. The main difference is only the relative amount of light that is reflected. For example, with a perfect mirror, all the light is reflected, whereas in a standard beam splitter, about half the light is reflected. Though, a beam splitter may be designed to reflect other fractions of the light such as, for example, about 25% or 75%. How much light is reflected, the reflectance, may also vary by wavelength or polarization.

Element 4 is a liquid-crystal (LC) matrix. This is an example of a modulation matrix and pixel. The pixels of the of the LC matrix modulate the polarization of the incident light, such that a polarizer converts the polarization changes to intensity changes to produce an image.

Element 5 is a phosphor matrix, comprising at least one layer of phosphor material. In some embodiments, the phosphor materials are those used in current OLED devices. Some display devices are hybrid devices that combine fluorescent (dmac-dps, dmac-dmt for blue light) and phosphorescence (for red/yellow light). Some OLEDs use thermally active delated fluorescence.

Typically, phosphor materials are organometallic doped with iridium, platinum, or titanium. For example, Ir(ppy)3 contains iridium as the central metal atom and emits green light. Ir(piq)2(acac) is an iridium-based phosphorescent emitter, which emits deep blue light. Ir(MDQ)2(acac) is a blue-emitting phosphorescent material based on iridium. PtOEP:Platinum octaethylporphyrin is a phosphorescent material known for emitting red light. Ir(2-phq)3 is an iridium-based phosphorescent emitter that emits yellow light. FIrpic: is a blue-emitting phosphorescent material based on iridium and fluorine. PmIr is a phosphorescent material that emits blue light, composed of polymers with incorporated iridium complexes. PFO-DBTO2 is a blue-emitting phosphorescent material based on polyfluorene. Btp2Ir(acac) is a green-emitting phosphorescent material based on iridium. Ir(ppy)2(acac) is a green-emitting phosphorescent material containing iridium. DPVBi is an efficient blue phosphorescent emitter that is used to produce blue OLEDs. The yellow phosphorescent emitter is Ir(tptpy)2(acac).

Other phosphorescent materials use phosphorescent pigments that contain compounds like strontium aluminate, which is doped with rare earth elements like europium or dysprosium, for use in highlighters, emergency signs and markings. Some glow-in-the-dark paints or dial indicators contain phosphorescent pigments based on zinc sulfide or strontium aluminate. Luminous elements on some watch and clock dials may consist of phosphorescent materials like tritium-based paints (though tritium is radioactive) or non-radioactive compounds like strontium aluminate.

Element 6 is a generic electro-optic (EO) material. It can be an EO rotator such that by variation of a signal voltage, a linear polarization can be rotated to a desired angle.

Element 7 is a polarization-dependent beam splitter (PBS). It reflects light of one polarization and transmits light of the orthogonal polarization. A PBS can be arbitrarily engineered and made using reflective polymer stacks, nanowire grids, or thin-film technologies. Other PBSs include PBS cubes.

Element 8 is an absorptive polarizer such that one polarization of the light passes through, and the orthogonal polarization of light is absorbed.

Element 9 is a half-wave plate (HWP), which produces a relative phase shift of 180 degrees between perpendicular polarization components that propagate through it. For linearly polarized light, the effect is to rotate the polarization direction by an amount equal to twice the angle between the initial polarization direction and the axis of the waveplate. In some embodiments, horizontally polarized light is converted to vertically polarized light, and vice versa, after transmission through an HWP.

Element 10 is a quarter-wave plate (QWP), which produces a relative phase shift of 90 degrees between perpendicular polarization components that propagate through it. In some embodiments, it transforms linearly polarized light into circularly polarized light, and it transforms circularly polarized light into linearly polarized light.

Element 11 is an angular profiling element. A directional film is an example of an angular profiling layer that allows the transmission of rays within a certain range of incident angles, whereas rays outside such a range of angles are blocked.

Element 12 is an absorptive matrix, which is a modulation matrix that absorbs incident light with each portion of the absorptive matrix having a varying property of absorbance. In some embodiments, the portions of the absorptive matrix all have the same property of absorptance and therefore acts as an attenuator.

Element 13 is a retroreflector, which is a mirror that reflects a light ray to reverse its direction. In some embodiments, a diverging spherical wave, or an expanding wavefront, is reflected by a retroreflector and forms a converging spherical wave. The retroreflector can be fabricated with microstructure such as microspheres or micro corner cubes or metasurfaces stacks, or it can be a nonlinear element. A phase conjugating mirror can act as a retroreflector.

Element 14 is a beam splitter, which partially reflects and partially transmits light. The ratio of reflected light to transmitted light can be arbitrarily engineered. In some embodiments, the transmission-to-reflection ratio is 50:50. In some embodiments, the transmission-to-reflection ratio is 70:30.

Element 15 is an antireflection (AR) element that is designed to eliminate reflections of light incident on its surface. A microstructure such as a nano-cone layer may be an AR element. In some embodiments an AR element is a thin-film coating.

Element 16 is a lens group, which consists of one or multiple lenses of arbitrary focal length, concavity, and orientation.

Element 17 is a reflective polarizer, which reflects a specific polarization direction whereas allows the transmission of the perpendicular polarization respect the polarization direction being reflected.

Element 18 is a diffuser, which serves to scatter light in a random or semi-random way. A diffuser can be a microbeaded element/array or have another microstructure. Diffusers may reflect scattered light or transmit scattered light. The angular profile of the light may be arbitrarily engineered. In some embodiments, light scattered by a diffuser follows a Lambertian profile. In some embodiments, the light scattered forms a narrower profile.

Element 19 is a micro-curtain that acts to redirect light into specified directions or to shield light from traveling in specified directions. A micro curtain can be made by embedding thin periodic absorptive layers in a polymer or glass substrate, or it can be made by fusing thin black coated glass and cutting cross-sectional slabs.

Element 20 is a diffractive optical element (DOE), which has a structure to produce diffractive effects. The DOE can be of any material and may be arbitrary engineered. In some embodiments, a DOE is a Fresnel lens.

Element 21 is a liquid crystal (LC) plate. In the "ON" state, the LC plate rotates the polarization of the light that passes through it. In the "OFF" state, the state of the light polarization is unchanged upon transmission through the layer. In some embodiments the LC is a nematic twisted crystal.

Element 22 is a light waveguide. In some embodiments, a display is formed by optically coupling a light source, such as a backlight, to a waveguide. In some embodiments, the waveguide comprises multiple waveguides or is wavelength dependent.

Element 23 is a spatial light modulator (SLM), which spatially modulates the amplitude or phase of light incident on it. An SLM may operate in reflection mode or transmission made, and it may be electrically addressable or optically addressable. In some embodiments, an SLM is used as a modulated matrix.

Similarly, element 24 is a digital micromirror device (DMD), which is an opto-electrical-mechanical mirror comprising mirror segments or pixels that each reflect light in a desired direction. Light incident on pixels corresponding to an image are directed in one direction, and unwanted light is directed into another direction. A DMD may be a modulation matrix.

Element 25 is the steering wheel of a vehicle. The steering wheel may alternatively be a yoke and throttle, or other instrumentation to direct a vehicle. The vehicle may be of any type, including an automobile, an aircraft, a maritime vessel, a bus, and the like.

Element 26 is the windshield of a vehicle. In some aircraft vehicles, the aircraft canopy serves as the windshield.

Element 27 represents an electronic signal that is used in the electrical system that accompanies the display system to modulate the optical elements or provide feedback to a computer or computational module.

Element 28 is a virtual image, which is the position at which a viewer will perceive an image created by the display systems disclosed herein.

Element 29 is a mechanical actuator that can physically move the elements to which are connected via an electrical or other types of signals.

Figure 2A:
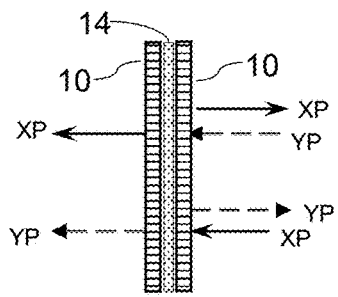
FIGS. 2A through 2C describe a set of basic configurations and simple architectures using the elements of FIG. 1, some of these configurations corresponding to field evolving cavities.
Figure 2A:
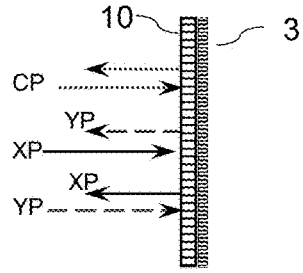
Figure 2A:
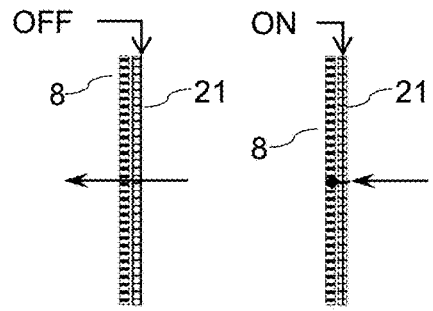
Figure 2A:
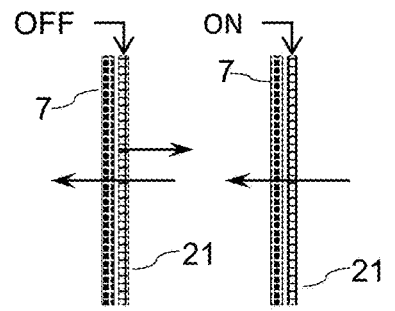
Figure 2A:
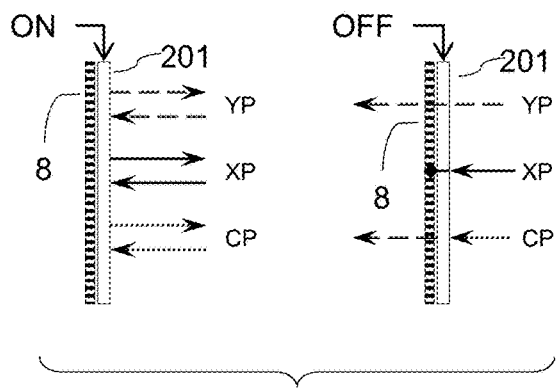
Figure 2A:
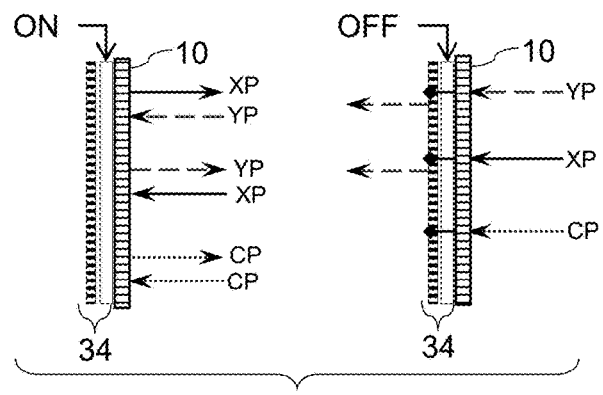
Figure 2B:
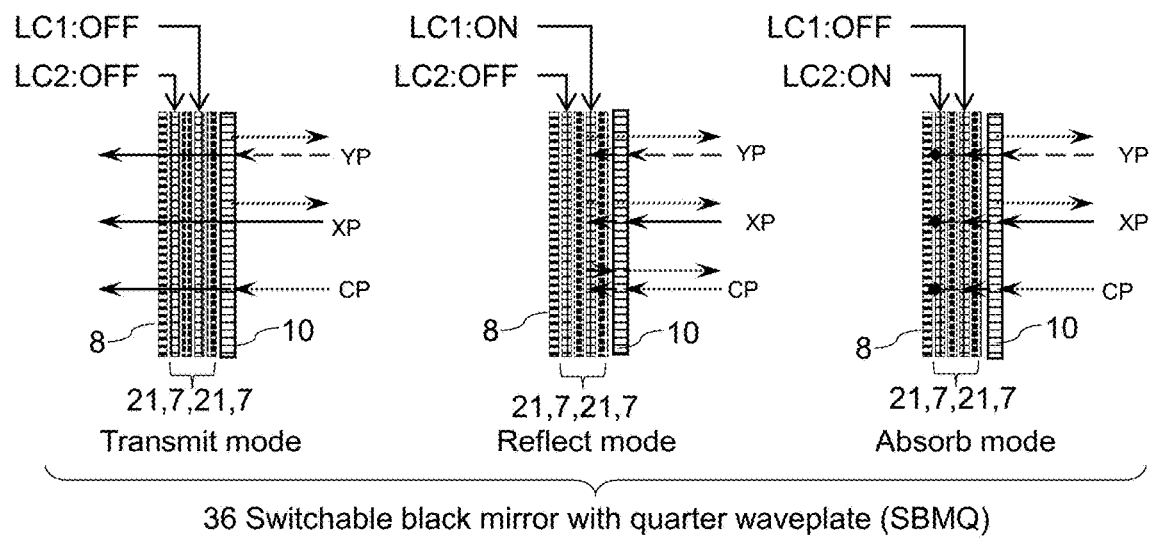
Figure 2B:
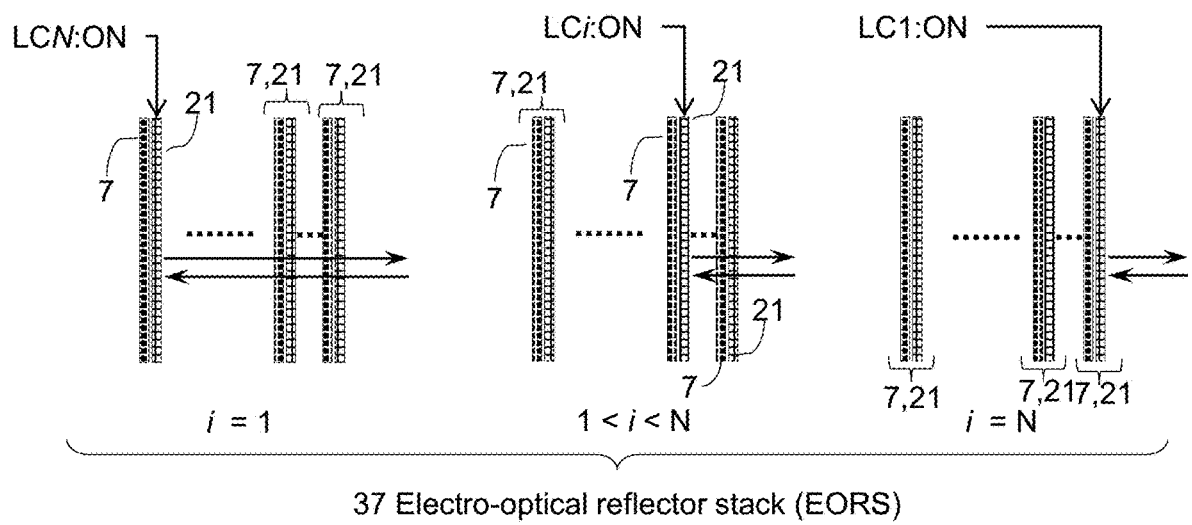
Figure 2C:
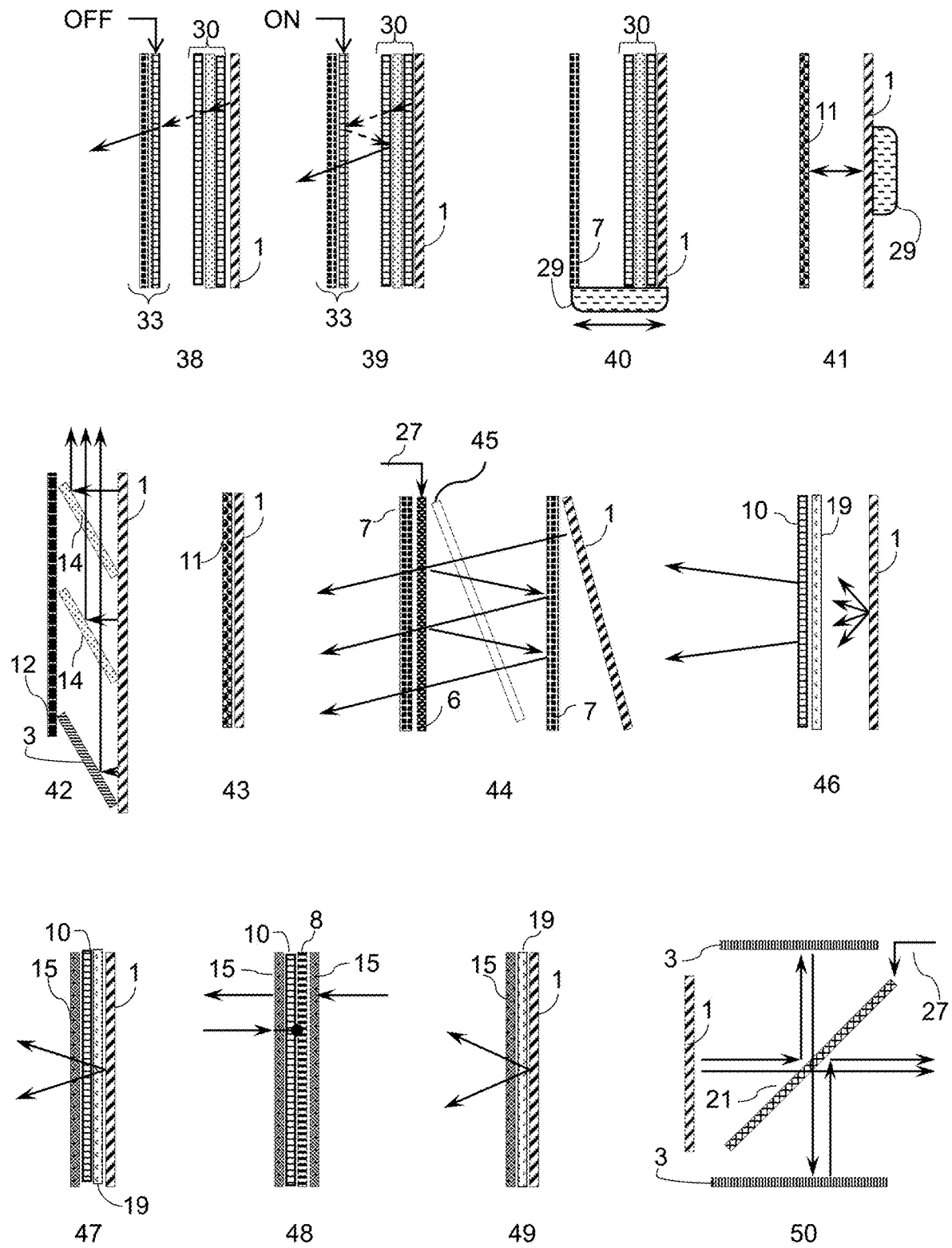

FIGS. 2A through 2C show how the basic elements in FIG. 1 can be combined to produce functional elements, architectures, subassemblies, or sub-systems. In some embodiments, these are integrated into a single, monolithic element, e.g., when a substrate is coated with various films or coatings. In some embodiments, they may be discrete components arranged with or without air gaps between them. In FIG. 2A, a QBQ 30 comprises a QWP 10, a beam splitter 14, and another QWP 10. Light incident on a QBQ is partially reflected and partially transmitted, and the QBQ acts as a HWP for both the reflected and transmitted portions, converting x-polarized light (XP) into y-polarized light and vice versa. In some embodiments the beam splitter is a PBS. A QM 31 comprises a QWP 10 and a mirror 3. It reflects all light, and it converts x-polarized light into y-polarized light and vice versa (or, equivalently, horizontally polarized light into vertically polarized light). It does not change the polarization state of circularly polarized light.

An electro-optic shutter 32 comprises an LC plate 21 and an absorptive polarizer 8. When the LC plate is ON, it rotates the polarized incident light such that it is aligned perpendicular to the absorptive polarizer and is absorbed by it. When the LC plate is OFF, it leaves the polarization unchanged and parallel to the absorptive polarizer which transmits it. An electro-optic reflector 33 comprises an LC plate 21 and a PBS 7. When the LC plate is ON, it rotates the polarization such that it aligned along the transmit orientation of the PBS. When the LC layer is OFF, the light passing through it is aligned such that the PBS reflects it.

A fully switchable black mirror (FSBM) 34 comprises an absorptive polarizer 8 and a full switchable mirror 201, which may be an EO material. In the ON state, the full switchable mirror 201 is on and reflects light of all polarizations. In the OFF state, the switchable mirror transmits the light, and an absorptive polarizer 8 extinguishes x-polarized light, transmits y-polarized light, and transmits only the y-component of circularly polarized light. A full switchable black mirror with quarter waveplate (FSMBQ) 35 comprises an FSBM 34 and a QWP 10. In the ON state, it reflects all light and interchanges x-polarized with y-polarized light (and vice versa). It reflects circularly polarized light without changing the polarization. In the OFF state it extinguishes circularly polarized light, transmits y-polarized light, and coverts x-polarized light into y-polarized light and transmits the result.

Shown in FIG. 2B are two switchable reflective stacks. A switchable black mirror with quarter waveplate (SBMQ) 36 comprises a QWP 10, followed by two alternating layers of LC plates 21 and PBSs 7, and finally one absorptive polarizer 8. The difference between the FSBMQ and the SBMQ is their corresponding polarization dependence. In the former the total reflectivity of the material is changing, agnostic to the polarization of the incident light, whereas the latter element produced a polarization-dependent reflectivity.

For the SBMQ 36, when both LC plates are OFF ("transmit mode"), all incident polarizations transmit an x-polarized component; incident linear polarization reflect circular polarization. Incident circular polarization reflects light that depends on whether it is right- or left-circularly polarized. When the first LC plate is ON and the second OFF (reflect mode), all light is reflected as circularly polarized. When the plate LC plate is OFF and the second LC is ON (absorb mode), incident light that strikes the absorptive layer and is extinguished, and no light is transmitted through the layers.

An electro-optical reflector stack (EORS) 37 comprises a stack of N alternating PBS 7 and LC plates 21. All but one LC plate is in the OFF state, and the LC plate that is in the ON state reflects the incident x-polarized light. All other layers transmit light. By varying which LC layer is in the ON state, the EORS modulates the optical depth or optical path or the length that the light must travel through the stack before it is reflected by a cross-polarized PBS layer next to the ON LC layer. In some embodiments the LC plates and PBSs are configured to reflect y-polarized light.

Shown in FIG. 2C are further combinations of elements. In some embodiments, these form a variety of field evolving cavities (FEC) or layer stacks that can be used as subsystems for architectures explained throughout the disclosure. 38 and 39 are OFF and ON states, respectively, of a display 1 and QBQ 30 followed by an electro-optic reflector 33. In the OFF state, the light directly exits the device to be viewed by an observer. In the ON state, the light is forced to travel one round trip in the cavity, and the displayed image appears to be deeper compared to the actual location of the display. In some embodiments, the monocular depth of the resulting image is approximately twice as far as that of the display itself. 40 is a display 1 followed by a QBQ 30 and a PBS 7 set on a mechanical actuator 29. The actuator shifts the set of layers to create longer or shorter optical path lengths for the light and hence shorter or longer monocular depths. 41 is a mechanical actuator 29 fixed to display 1. The actuator can shift the display relative to an angular profiling element 11 to force the light to change directionality or to become collimated. In some embodiments, the angular profiling layer is a lenslet array such that the mechanical movement of the display changes the object distance and therefore impacts the collimation. In some embodiments, the display is "macro-formed," meaning it may have mechanical waves or bends induced onto it by the mechanical actuators so that the directionality or collimation of the light that comes out of the angular lenslet array is impacted in a desired way. In some embodiments other elements, such as a beam splitter or mirror, are macro-formed.

In some embodiments, the display is mechanically shifting, because of the actuator's motion along a translational axis, again to impact the directionality of the exit light from the apertures. The mechanical actuation mechanism may be arbitrarily engineered. In some embodiments, the mechanical actuator is an array of ultrasonic transducers; in some embodiments, the mechanical translation is performed by a high rotation-per-minute brushless motor; in some embodiments, the mechanical movements are delivered via a piezo- or stepper motor-based mechanism.

An example of one type of FEC 42 consists of display 1 that is partitioned into segments, i.e., a segmented display. Light from the bottom segment is reflected by a mirror 3, and light from the upper segments is reflected by subsequent beam splitters 14. An absorptive matrix 12 absorbs unwanted stray light. In some embodiments the absorptive matrix is a uniform attenuator to substantially absorb all the light incident on it uniformly across its surface. This is an example of an off-axis FEC. In some embodiments, the FEC produces a multifocal image. The FEC can be arbitrarily engineered to represent the desired number of focal planes.

43 consists of display 1 layer followed immediately by an angular profiling element 11, which may be a directional film here. The angular profiling layer might be a lenticular lens array to provide stereopsis to the viewer, or it might be a lenslet array or any other angular profiling layer to provide autostereoscopic 3D or provide different images to different angles.

An example of a tilted FEC 44 is an angled display 1, followed by a FEC comprising an "internal polarization clock" whose ends are composed of PBSs 7. In between the PBSs 7 is an EO material 6 that acts as a polarization rotator and a birefringent element (which is a material whose refractive index depend on direction of travel and/or polarization, i.e., an anisotropic material) 45, such that different angles of propagation result in different phase retardation of polarization. Another EO material 6 acts as shutter element that uses an electronic signal 27 that turns the light into a desired polarization so that only one of the round trips are allowed to exit the cavity, and the transmitted light has traveled a desired optical path or depth. This is a representation of a coaxial FEC with polarization clocks and segmented gated apertures with desired gating mechanisms. In some embodiments, each of these elements is segmented, such that light from different portions of a segmented display travel different distances.

46 is a display 1 followed by a micro-curtain 19 and a QWP 10 to function as pre-cavity optics. This allows desired profiling of the light of the display. The pre-cavity optics can adjust the polarization, angular distribution, or other properties of the light entering the cavity. 47 shows of a stack of elements: a display 1, a QWP 10, a micro-curtain layer 19, and an antireflection element 15. This subsystem is used in many disclosed systems and is categorized as a display. The micro curtain can be arbitrarily engineered, and it allows for control of the directionality of the light and the visibility of the display. The AR layer allows for reduction of ambient or internal reflections of the systems that use this subcomponent. In some embodiments, the AR element is a coating on substrate.

Subassembly 48 is a sub-assembly consisting of an AR element 15 and an absorptive polarizer 8 on one side facing a viewer and outside world, and a QWP 10 another optional AR element 15 or film on the side that faces the display from which light exits. In some embodiments, the AR element is a coating on substrate. In this disclosure, 48 is an example of aperture optics called an ambient light suppressor. In some embodiments, the ambient light suppressor is the final set of optical elements that the light experiences before exiting the display system. In some embodiments, the ambient light suppressor further comprises a directional film or angular profiling layer to produce angular profiling of the light exiting the system.

Subassembly 49 is a subassembly of a display with micro curtain layer and an AR element 15 on top.

An example of an off-axis, or non-coaxial FEC 50 is a sub-assembly consisting of two mirrors 3 on the top and bottom, a display 1 at the back, and an angled PBS 7 with LC plate 21 in the middle such that the electronic signal 27 to the LC can change the length that the light must travel before it exits the cavity. In some embodiments, a stack of such angled PBS-on-LC splitters such that the length of the light travel can be programmed or controlled in multiple steps. In some embodiments, the mirror is a QM to rotate the polarization of the light.

Figure 3A:
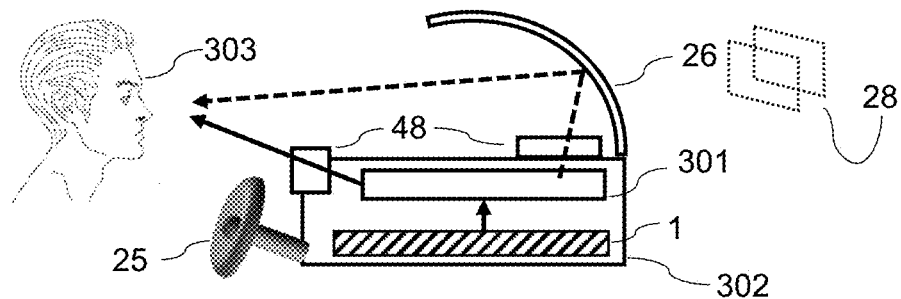
FIGS. 3A through 3I depict a set of embodiments for integrated visualization systems and virtual displays, including multipurpose HUDs, ambient-light-driven displays, and hovering real images with which a viewer can interact through a sensor such as a gesture camera.

FIGS. 3A through 3D illustrate side views of the embodiments for multipurpose in-vehicle display systems that use either backlighting sources or ambient-light sources. In FIG. 3A is shown an example of a "dual-purpose in-vehicle display," for which two sets of images are visible simultaneously by a viewer. A display 1, which is a segmented display in some embodiments, emits light into an optical system 301, both of which are contained in housing 302. In some embodiments, the optical system comprises an FEC, and the FEC is of the architecture of those in FIG. 2C. The optical system modulates the light, including its optical path, and sends some of the light directly to a viewer 303 after passing through an ambient light suppressor 48. Some of the light, before being sent to the viewer, exits the system through an image aperture or ambient light suppressor 48, is reflected by the vehicle's windshield 26, and then subsequently travels to the viewer to form a second virtual image for the viewer, who sees both the first and the second virtual images simultaneously. The viewer may be a driver behind a steering wheel 25. In some embodiments, the viewer is another passenger or multiple passengers. In some embodiments either the first or the second virtual image are multifocal images. In some embodiments, the monocular depth of the first image differs from that of the second image.

Figure 3B:
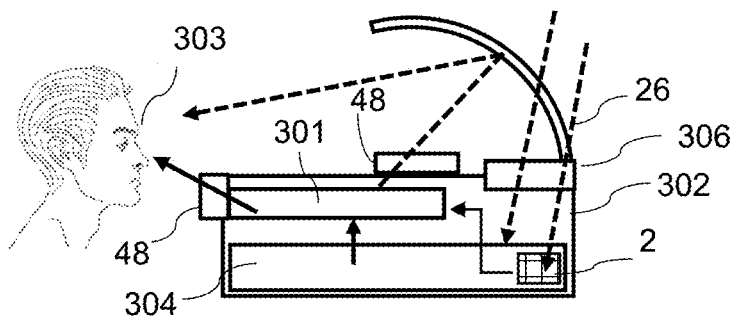

FIG. 3B is an example of an "in-vehicle sunlight-activated display system," for which ambient light external to the display system serves as the light source for producing images. In such a display, ambient light from outside the vehicle enters the vehicle. In some embodiments, the ambient light enters the vehicle through the windshield 26 from the external environment. Some of the light may be sensed by a sensor 2, configured to produce an electrical signal based on the amount of light detected. The light then enters a sunlight modulating panel 304 where it is prepared to enter an optical system 301 to form an image that is directed to a viewer 303. In some embodiments the sunlight modulating panel and the optical system form a single display system. The sunlight modulating panel contains a modulation matrix to imprint image content onto the ambient light. In some embodiments the sunlight modulating pane comprises only the modulation matrix. In some embodiments some of the light forms an image corresponding to an instrument cluster. In some embodiments, the virtual images may form port of an entertainment system for a non-driving passenger of the vehicle. In some embodiments, at least a portion of the light exits the optical system 301 past the housing 302 and is reflected by a windshield to produce a HUD image for the viewer, i.e., some embodiments use the ambient light instead of the display in the embodiment of FIG. 3A. The light that exits the system passes through image apertures, such as ambient light suppressors, 48.

The ambient light sensor may control the optical system at least in part. In some embodiments, if the detected light is too low, or dim, the ambient light sensor controls and turns on a back-up display to produce the desired imagery instead of the ambient light. This occurs, for example, at night or in dark environmental settings. The ambient light may be sunlight entering the vehicle directly or indirectly. In some embodiments, the ambient light for the sunlight-activated display comes from other sources external to the vehicle.

Figure 3C:
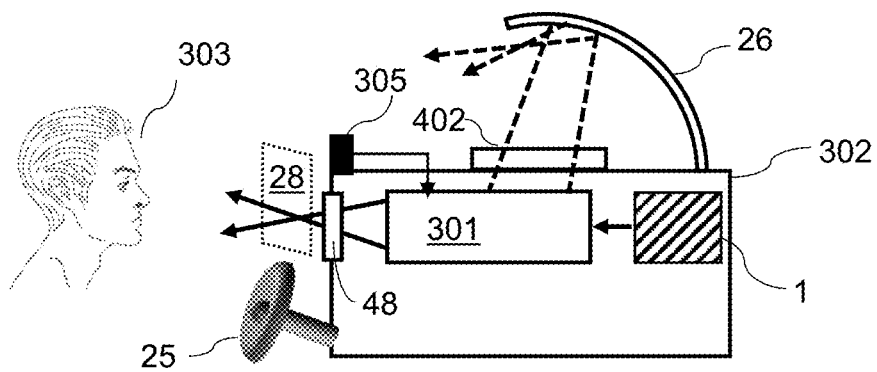

FIG. 3C is an embodiment of a multipurpose display system that produces virtual images whose monocular depth is closer to a viewer than the physical components of the display system itself. Such images first must form a real image. Light from a display 1 enters an optical system 301 in a housing 302. The optical system then prepares images and sends some of the light through an ambient light suppressor 48 forming a real image after exiting. A viewer then perceives an image at the location of the real image, closer than the ambient light suppressor, i.e., the monocular depth of the image will be shorter than the viewer's distance to the display system. Because the virtual image is first formed as a real image and will appear to the viewer as floating, or hovering, in front of the display panel, such an image is called a "hovering real image."

In some embodiments a gesture camera 305 is used to capture and recognize gestures made by the viewer. The information is then sent to the optical system to modify the image. In some embodiments, the camera can control other systems of the car, such as the electrical system, audio system, mechanical system, or sensor system. In some embodiments, the light is reflected from a windshield 26 after exiting the system through an exit aperture 402 to produce a virtual image that is perceived as being located inside the vehicle, rather than outside. The viewer is a driver behind a steering wheel 25 in some embodiments—in which case the images may correspond to instrument cluster information.

Figure 3D:
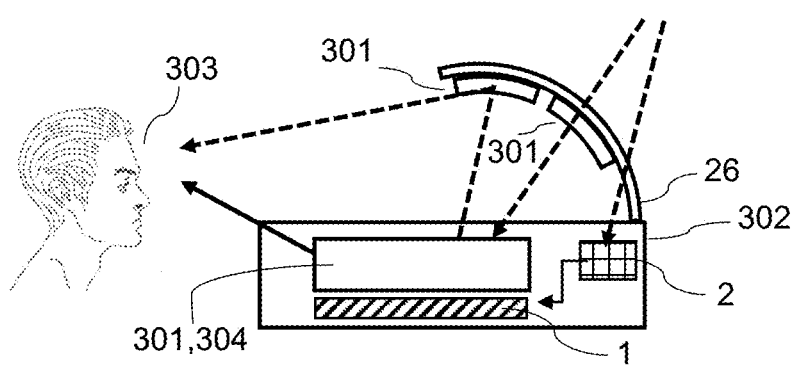

FIG. 3D shows an embodiment in which parts of the optical system 301 are embedded into or layered on top of the windshield 26. In some embodiments, the optical systems integrated into the windshield comprise DOEs, anti-reflection coatings, or other directional or angular profiling layers, in order to collect more light for the ambient light displays of FIG. 3B. In some embodiments, the optical systems integrated in the windshield occur after light from a display 1 enters a primary optical system 301 in a housing 302 and exits toward the optical system in the windshield. In this case, for example, the windshield-integrated optical system further impacts the resulting HUD image that a viewer 303 sees. In some embodiments, an ambient light sensor is used to signal to the display system whether to use a display, the ambient light source, or a combination thereof.

Figure 3E:
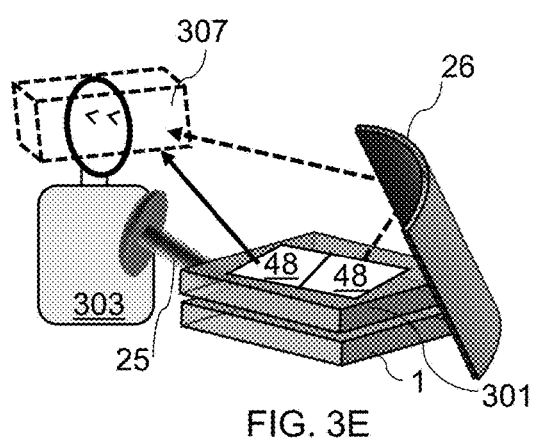

FIGS. 3E through 3H show perspective views of the display system embodiments described in FIGS. 3A through 3D. FIG. 3E shows a perspective view of FIG. 3A. Light from display 1 enters an optical system 301 and is prepared and formed into a virtual image. The light exits through an ambient light suppressor 48. A portion of that light is then reflected by the windshield 26 to the viewer 303, who sees a virtual image, similar to that formed by a HUD. Some light also passes directly to the viewer without interacting with the windshield at all to produce a second virtual image. The images are simultaneously visible to the viewer anywhere in a headbox space 307. The viewer may be a driver behind a steering wheel 25—in which case the images may include instrument-cluster information.

Figure 3F:
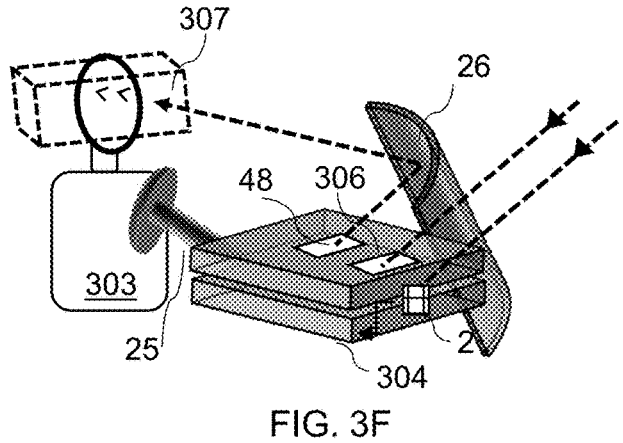

FIG. 3F shows a perspective view of FIG. 3B for a sunlight-activated display. External, or ambient light, for example sunlight, enters from the outside of the vehicle through the windshield 26. In some embodiments this light is direct sunlight, and in some embodiments, it is diffused or reflected sunlight. The light enters through the entrance aperture optics 306. Some of the light may optionally be captured by a sensor 2 that measures the amount of light power entering the vehicle or the temporal or spatial variability of the light. Light also enters the sunlight modulating panel 304 which prepares the light as it enters the optical system 301. Inside either the sunlight-activated panel or the optical system is a modulation matrix to imprint a virtual image onto the light, which then exits the system through an ambient light suppressor 48. Some of the light is visible directly by a viewer 303. In some embodiments, some of the light is first reflected by the windshield 26 before being visible. The images are viewable in a headbox space 307. In some embodiments, the viewer is a driver.

Figure 3G:
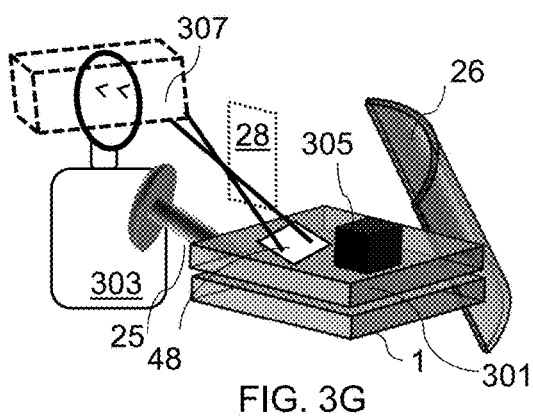

FIG. 3G is a perspective view of FIG. 3C. Light from display 1 enters optical system 301, where it is prepared as an image. The light exits through an ambient light suppressor 48 and forms a real image. When the viewer 303 views the image within the headbox 307, he sees a virtual image 28 whose monocular depth is closer compared to the distance to the actual optical system, including the ambient light suppressor. Because the image is closer to the viewer than the display system, it is a hovering real image. A gesture camera 305 captures information about the gestures of the person and uses that information to modify the image or to impact a property of the vehicle.

Figure 3H:
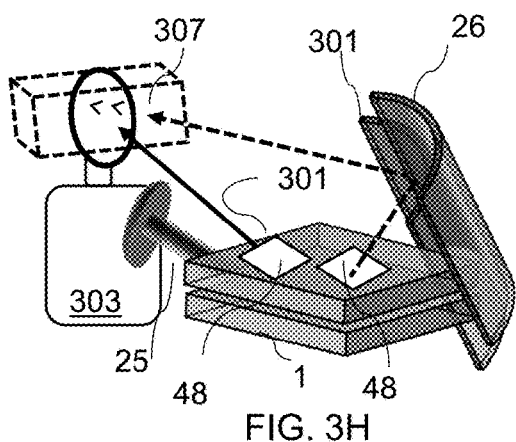

FIG. 3H is a perspective view of FIG. 3D. A display 1 emits light into an optical system 301. Some of the light may exit an ambient light suppressor 48 and be directly visible by a viewer 303 within a headbox space 30 as a first virtual image. Some of the light may exit a second ambient light suppressor 48 and become incident on a second optical system 301 that is integrated into the windshield itself 26. This windshield-integrated system may consist of, for example, directional films, DOEs, waveguides, or polarization-dependent elements. The light is then viewed as a second virtual image by the viewer simultaneously with the first virtual image.

Figure 3I:
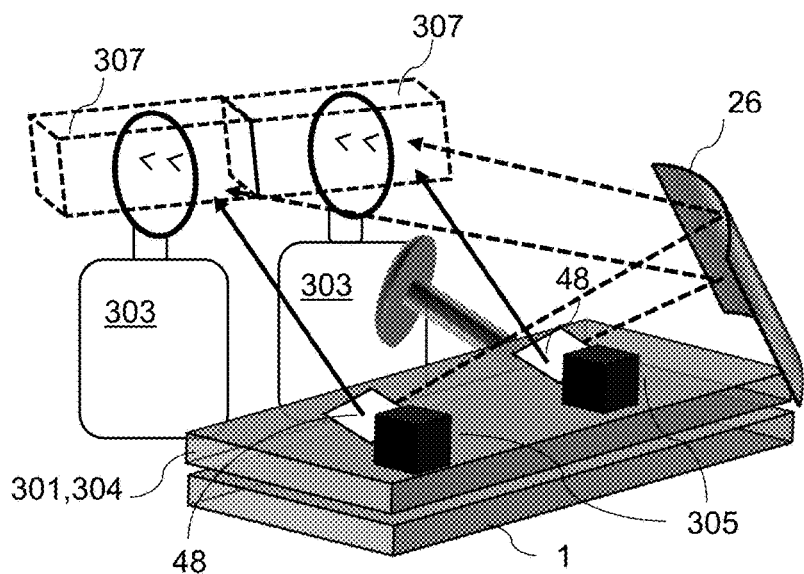

FIG. 3I depicts a perspective view of multiple passengers in the vehicle. The light from display 1 enters an optical system or, if entering the vehicle from the environment, a sunlight modulating panel 304 to create virtual images after exiting through ambient light suppressors 48. The viewers 303 can see these images within headboxes. The headbox 307 of each viewer may in fact be a single continuous volume, such that both viewers see all virtual images simultaneously. Some of the light may be reflected by the windshield before being visible. Gesture cameras 305 may capture viewers' gestures to impact the vehicle or the images.

All embodiments in this disclosure may use computational methods for distortion compensation, e.g., all embodiments may have distortion-compensating elements or computational measures.

The embodiments described herein have utility for in-vehicle integration as display systems that do not require the viewer to wear a headset. Further, the virtual images formed by the display systems are visible by both eyes simultaneously, such that they are visible in a headbox that is wider than the average interpupillary distance, i.e., the distance between the two eyes. In some embodiments, the headbox spans a lateral dimension of 10 cm or more. Further, in some embodiments, the image apertures through which the light rays leave to form virtual images are also wider than the interpupillary distance. In some embodiments, the image apertures span a lateral dimension of 10 cm. In some embodiments they span a lateral dimension of 15 cm.

Figure 4A:
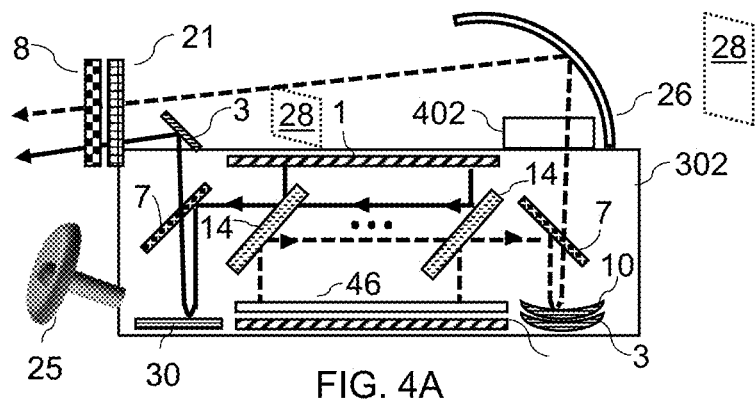
FIGS. 4A through 4M depict a set of embodiments of multipurpose display systems that combine HUDs with integrated visualization display systems, including those for instrument clusters in a vehicle.

FIGS. 4A through 4M depict a set of embodiments for a multipurpose display system for a vehicle. In FIG. 4A a housing 302 contains a display 1 or a plurality of them. In some embodiments, the displays are segmented displays, for which each display shows a plurality of display content. In some embodiments the light from the display is impacted by pre-cavity optics 46. The top display emits light that is reflected by a set of beam splitters 14. The light travels to the left and is reflected by a PBS 7, which directs the light downward to a QM 30. The QM reflects the light and rotates the polarization such that it is transmitted by the PBS 7 and then directed to a mirror 3 to a viewer. A second display at the bottom of housing 302 emits light vertically upward. The light is then reflected by each of the beam splitters 14. The light is then reflected by another PBS 7, through a QWP 10, reflected by a mirror 3, and back through the QWP 10 (the QWP-mirror-QWP reflection is identical to a QM). In some embodiments, the mirror is curved whereas in some other embodiments, the mirror is flat. After doubly traveling through the QWP, the light polarization is rotated by ninety degrees, passes through the PBS 7, through a generic image aperture 402, and then is reflected by the windshield 26 to produce a virtual image, such as a HUD image.

In some embodiments, the number of segments of the segmented display equals the number of focal planes at which virtual images are seen. In some embodiments, each display produces three virtual images at three different focal planes. In some embodiments, two such displays together produce a 3-focal-plane multifocal image for an instrument cluster and simultaneously a 3-focal-plane multifocal virtual image reflected from the windshield.

In some embodiments, the mirror 3 closest to the steering wheel is instead a transparent or dimmable liquid crystal layer. In some embodiments both sets of virtual images pass through both a dimmable LC layer 21 and absorptive polarizer 8 to produce a dimmable (semi-)transparent display. In some embodiments, the beam splitters inside the display system are polarization dependent beam splitters.

Figure 4B:
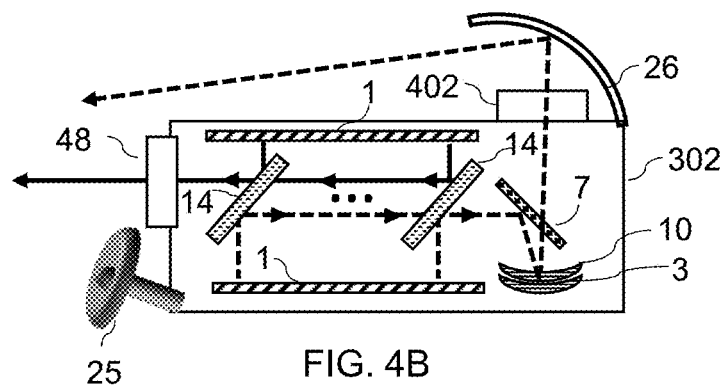

In the embodiment in FIG. 4B, a housing 302 contains displays and optical components. A bottom display 1 emits light upward toward a set of beam splitters 14 that direct the light rightward, where it is reflected by a PBS through a QWP 10, then reflected by a mirror 3, and travels back through the QWP 10, after which its polarization is rotated by ninety degrees. The light that passes through the PBS 7, through a generic image aperture 402, and is reflected by the windshield to create a virtual image, such as a HUD image. The image aperture may be an ambient light suppressor. A second display 1 emits light downward to the beam splitters 14, which reflect the light leftward. The light then exits the system through an ambient light suppressor 48 to be viewed by, e.g., a driver behind a steering wheel 25, simultaneously with the HUD image. In some embodiments the ambient light suppressor contains AR elements, a polarizer, and a QWP, as shown in FIG. 2C.

Figure 4C:
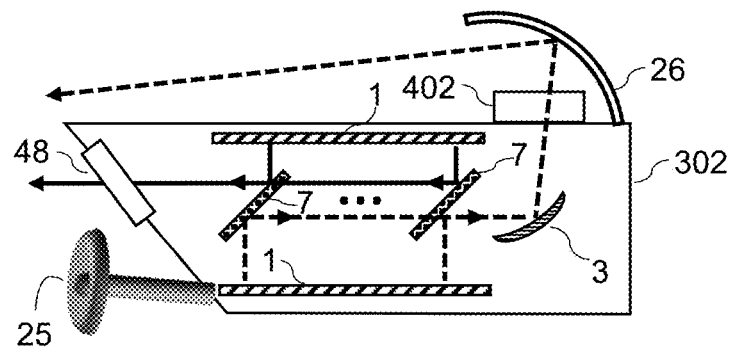

In FIG. 4C, a first display panel 1 in a housing 302 emits light upward to a set of PBSs 7 which direct the light rightward to a mirror. In some embodiments the mirror is curved; in some embodiments the mirror is flat. The light then passes through an exit aperture 402 is reflected by the windshield and produces a HUD image for a viewer, e.g., a driver behind a steering wheel 25. A second display 1 emits light downward, and the set of PBS 7 elements reflect the light leftward. Then it travels through an ambient light suppressor 48, after which a viewer views it as a virtual image. In this embodiment, the ambient light suppressor is angled such that a line perpendicular to its surface is not along an optic axis of the system.

Figure 4D:
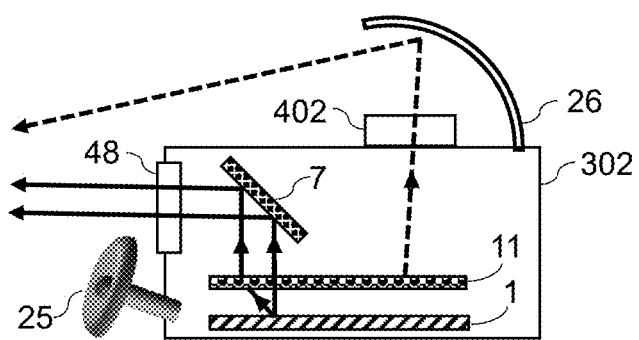

The embodiment in FIG. 4D has a housing 302 that contains a display 1 that emits light. The display light is segmented, such that one portion shows display content corresponding to a HUD image, and another portion is directly viewed without the light being reflected by the windshield after exiting the system through an exit aperture 402. The light travels through an angular profiling element 11, which may be a directional film, to reduce stray light or redirect light in a desired direction. One of the display contents is then reflected by the windshield 26 to produce a virtual image, such as a HUD image. A second display content is reflected by a reflector, which is a PBS 7 in some embodiments, and exits through an ambient light suppressor 48 to form a virtual image. Both images are simultaneously viewable.

Figure 4E:
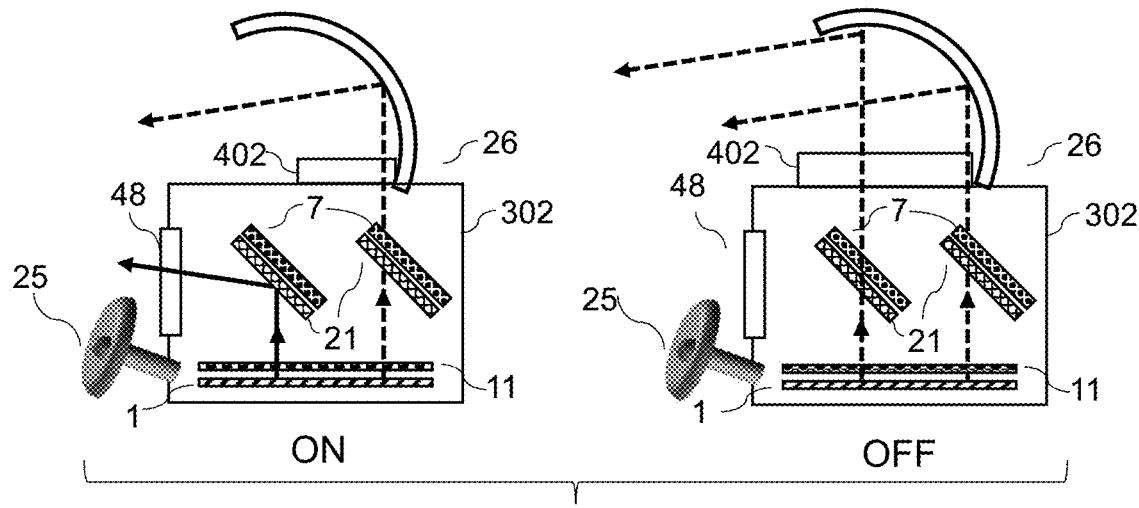

FIG. 4E is an embodiment in which the display system contains electrically switchable components to produce variable images. For example, a display 1 emits light through an angular profiling element 11, which may be a directional film. The display is a segmented display. One portion of light strikes an LC plate 21 that is ON. The result is polarized light that is reflected by a PBS 7, through an ambient light suppressor 48 to produce an image, such as an instrument cluster behind a steering wheel 25. A second part strikes a second LC plate 21, which may be OFF, but the subsequent PBS 7 is oriented such that it transmits the light, which is then reflected by a windshield 26 to produce a second image. In the OFF state of the first LC layer 21, the first portion of light has its polarization rotated such that both portions of light are incident on the windshield 26 to produce two HUD images after traveling through an exit aperture 402. In some embodiments, the HUD images are a single continuous image. The number of portions and switchable elements is arbitrary. For a display with N segments, there are $2^N$ possible image configurations. In some embodiments, there are multiple displays, each being a segmented display with one or more display contents.

Figure 4F:
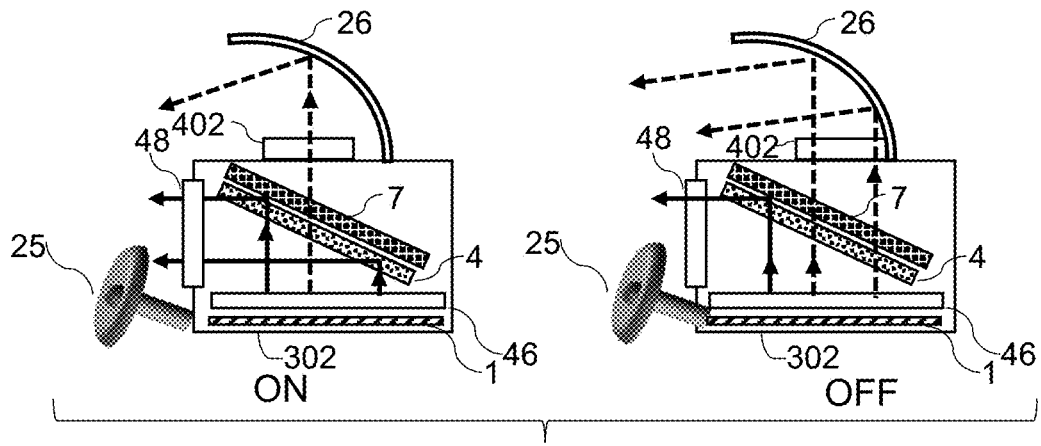

FIG. 4F shows a similar embodiment as that in FIG. 4E. In this case, the switchable element is an LC matrix 4. In some embodiments, the pixelation of this matrix corresponds to the segmented size of the display, i.e., to the number of display images shown on display 1, which is a segmented display. In some embodiments, the light passes through pre-cavity optics 46. As the light travels through the liquid crystal matrix, various portions may be ON to impact the polarization, such that two portions of the segmented display are reflected by the PBS 7, travel through an ambient light suppressor 48, to be visible as virtual image (which may be a multifocal image). One segment may be configured to travel through the PBS 7, through an exit aperture 402, be reflected by the windshield 26 and create a HUD mage. In the OFF configuration, only one segment travels through the ambient light suppressor, and two segments travel through the PBS to be reflected by the windshield.

Figure 4G:
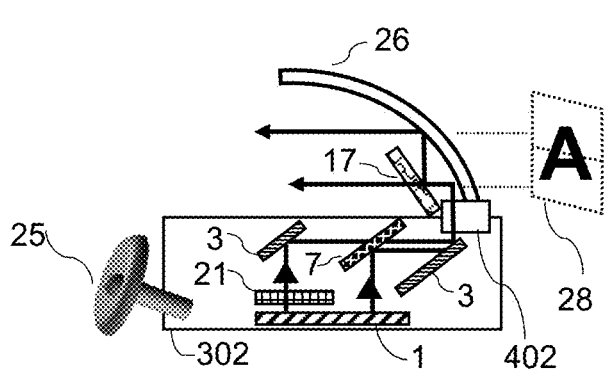

In FIG. 4G, a housing 302 contains a display 1, which may be a segmented display. The first portion travels through LC plate 21. In some embodiments, this is replaced by a wave plate, such as a HWP. The light then is reflected by a mirror 3, transmitted by a PBS 7, and reflected by a second mirror 3. The second portion of the display emits light that does not travel through an LC plate or wave plate, so its polarization differs from that of the first portion. Then, the light is reflected by the PBS 7 and subsequently by the second mirror 3. Then, both portions of light are reflected by the windshield for a first time, after which they are incident on a reflective polarizer 17. This polarizer is oriented such that it passes the first portion of light and reflects the second portion, the second portion passing through an exit aperture 402 then being reflected a second time by the windshield 26 before heading to a viewer. The first portion and the second portion therefore travel the same optical distance, and their images have the same monocular depth, but they are now shifted transverse to their propagation direction. The reflections and geometry are arranged such that the two portions form one continuous virtual image at a single monocular depth, the size of the image larger than each portion individually. The result is that the virtual image 28 image size (its transverse area) is larger than the size (transverse area) of the exit aperture 402. In some embodiments at the exit aperture is located an ambient-light suppressor. In some embodiments, the two portions travel through an ambient light suppressor without interacting with a windshield, such that the resulting image is larger than the ambient light suppressor.

Figure 4H:
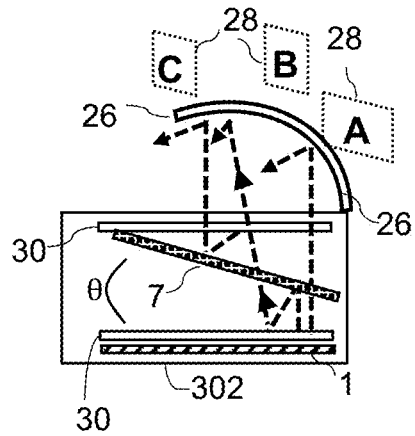

FIG. 4H shows an embodiment in which a display 1 emits light through a QBQ 30. The light that is transmitted through it is polarized perpendicular to the light that enters it. The QBQ is segmented and electrically addressable, such that the polarization change of different portions is modifiable independent of the others. This is produced, for example, but having two LC matrices sandwiching a beam splitter. The result is that different portions of the display light have different polarizations programmed into them. The light then subsequently strikes a PBS 7, that is angled relative to the display, such that the surface of the PBS and the surface of the display form an angle θ. In some embodiments, θ is an acute angle. Because different portions of light are polarized differently, some of the light is reflected by the PBS and some is transmitted. The light that is transmitted strikes a second QBQ 30, which is also segmented and electrically addressable. Some of the light passes through it and is reflected by a windshield 26. Light that is reflected, either by the PBS before passing through it or by the second QBQ, can experience further polarization changes and reflections, depending on how the QBQs are addressed. After multiple reflections, light that is transmitted to the windshield is shifted by an amount that depends on the number of reflections. Thus, multiple disjoint HUD images are visible, and the size and spacing of these images is programmable by the electrically addressable QBQs. Similarly, the angle at which light exits the display system also depends on how the QBQs are addressed. In some embodiments light exits in the same direction as that emitted by the display. In some embodiments, light exits at an angle different from the display light.

In any embodiment the monocular depth at which the image is perceived may be modified by inserting a slab of a refractive index n. In embodiments in which different virtual images are produced by different polarizations, the slab may be an anisotropic material, such as a uniaxial crystal or a biaxial crystal, to modify the polarizations differently. An anisotropic LC may be used to electrically modulate the index and consequently the monocular depth.

Figure 4I:
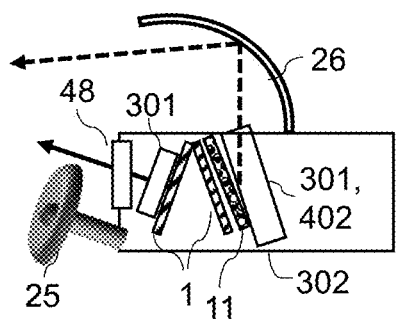

FIG. 4I shows an embodiment in which two displays 1 are each angled and positioned within a housing 302. One of them sends light through an optical system 301, which impacts the profile and monocular depth, and then sends the light through an ambient light suppressor 48, this first image visible by a viewer, for example, the driver behind a steering wheel 25. The second display 1 emits light through a directional filmi 11 then through an optical system 301, and an exit aperture 402. In some embodiments the exit aperture comprises a ambient light suppressor. The light is subsequently reflected by a windshield 26 to produce a virtual image, such as a HUD image, simultaneously visible with the first image. In some embodiments, the images are pre-compensated to account for the angular variation of the displays or the windshield.

Figure 4J:
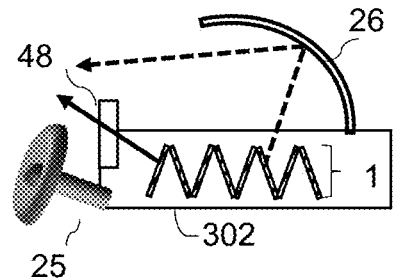

FIG. 4J generalizes the embodiment of FIG. 4I Multiple displays 1, or a single flexible display, are oriented so that one subset emits light through an ambient light suppressor 48 for a first (set of) virtual image(s), and a second subset emits light toward the windshield 26 to produce a second (set of) virtual image(s). In some embodiments, the displays are segmented displays. In some embodiments, the display shows content that is precomputed for distortion compensation. In some embodiments, either of the virtual images are multifocal images.

Figure 4K:
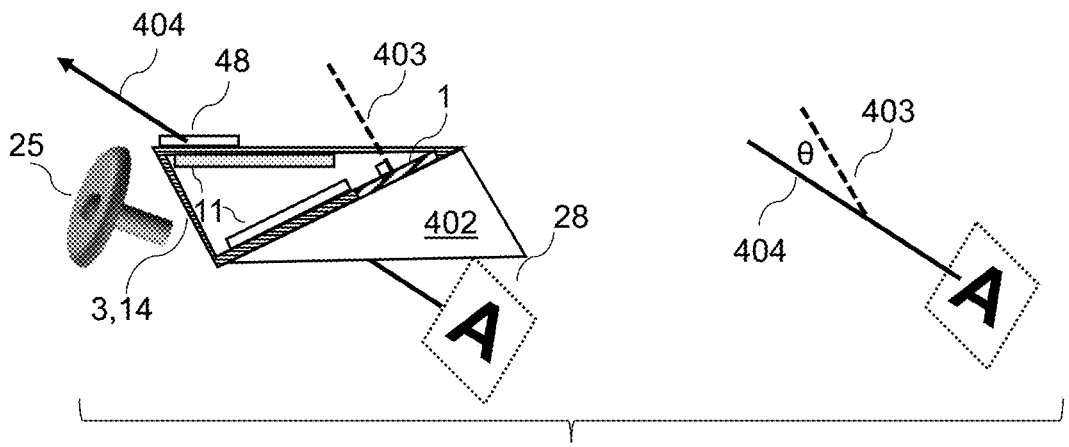

FIG. 4K shows an embodiment in which display 1 is tilted such that a chief ray 403 it emits points at an angle relative to the horizontal. In this embodiment this chief ray coincides with the line that is normal (perpendicular) to the display surface. The light enters a cavity comprising mirrors 3 and/or beam splitters 14 (i.e., semi-reflective) surfaces. Optional directional films 11 and angular profiling layers may be used to impact the angular profile of the light. As the light is reflected within this cavity, its optical path increases and its direction changes. Upon exiting through an ambient light suppressor 48, the chief ray of the virtual image 404 is directed along a certain angle. This direction is perpendicular to the focal plane of the image. A viewer, for example, a driver behind a steering wheel 25, sees a virtual image 28. The optical path traveled by the image light equals the monocular depth of the image as perceived by the viewer. Because of the angular variation, the chief ray of the virtual image 404 and the chief ray of the display 403 from an angle θ, which is acute in some embodiments.

The embodiment of FIG. 4K may be integrated into other portions of a vehicle. For example, in some embodiments, it replaces a rearview mirror. In some embodiments, the display content is captured from a camera that is fixed to an external part of the vehicle, and the camera captures visual information about the environment behind the vehicle. The display panel subsequently shows the visual information. In some embodiments, the display system is integrated into the roof of a car and is configured for passenger entertainment.

Figure 4L:
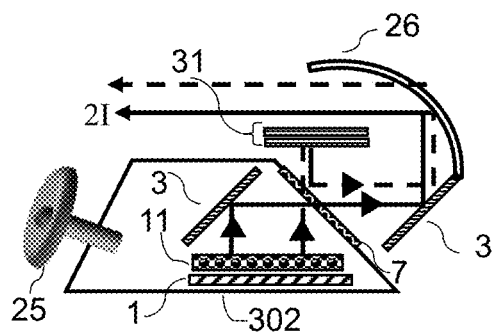

FIG. 4L shows an embodiment that starts with housing 302 containing display 1, which may be a segmented display. The display emits light through a directional film. The display is segmented, and the first portion travels through a mirror 3 and through a PBS 7. The second segment travels upward through the PBS 7, then is reflected and rotated in polarization by a QM 31. The light, with its polarization rotated by 90 degrees, is reflected by the PBS 7. Both portions of light subsequently overlap, are reflected by a second mirror 3 and by the windshield 26 to form a virtual image. If the two portions show identical content, then the intensity, or brightness, of the image is approximately doubled. It may increase by less than a factor of two based on any imperfections in the optical components. Further, both portions travel the same optical distance, so that the two portions also correspond to the same monocular depth or focal plane.

Figure 4M:
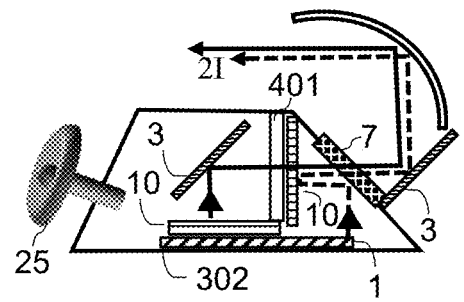

FIG. 4M shows an embodiment like that in FIG. 4L. Light from display 1 is segmented. The first portion travels through a QWP 10 to convert it to circular polarization. It is reflected by a mirror 3 and passes through a circular polarizer (CP) 401, then through a second QWP 10 after which it is linearly polarized and passes through a PBS 7. The PBS first reflects a second portion of light, passes through the QWP, is reflected by the CP 401, passes again through the QWP 10, and is then polarized to pass through the PBS, and be reflected by the mirror second mirror 3. At this position, both portions of light overlap and have traveled the same distance. In some embodiments, they show the same content, and so effective brightness is about a factor of 2 greater than either portion individually. The light is then reflected by the windshield and generates virtual images for the viewer.

FIGS. 5A through 5I illustrate embodiments in which ambient light is collected and manipulated to generate a virtual image, which may be a HUD image, to be seen by the viewer, who may be a driver or other passenger. In some embodiments, the ambient light is too dim to be used as an image, an alternative backlight or display is used instead. In these embodiments, the optical components form a sunlight modulating panel 304 and an optical system 301.

Figure 5A:
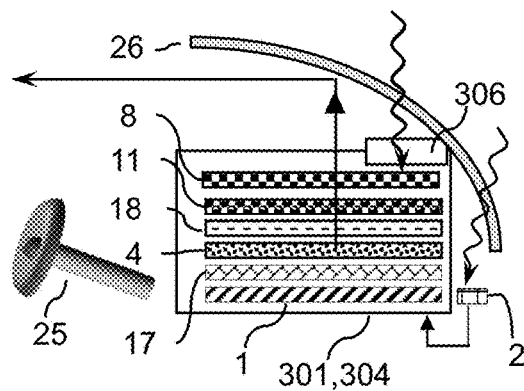
FIGS. 5A through 5K depicts a set of embodiments of virtual display systems that use ambient light as the light source.

FIG. 5A depicts an embodiment in which ambient light enters the vehicle through the windshield 26 and enters the optical system 301 and sunlight modulating panel 304 through an entrance aperture or entrance aperture optics 306. In some embodiments the entrance aperture optics is a transparent window. In some embodiments it comprises AR elements, directional films, or other angular profiling elements. And goes through an absorptive polarizer 8 to polarizer the ambient light. In some embodiments, the polarizer is a coating on or integrated into the windshield itself. The polarized light then travels through an angular profiling element 11, which is a directional film here, and a diffuser 18 to make the light more spatially uniformly bright and to direct the light rays toward the other optical components. In some embodiments, the diffuser is only weakly diffusing such that the spatial variation of the intensity is not changed substantially. In some embodiments the order of the angular profiling element and diffuser are reversed. The light then travels through an LC matrix 4, which acts as a modulation matrix to manipulate the polarization state of the incoming ambient light. The manipulated light is reflected by a reflective polarizer 17 and back through the polarizer diffuser and angular profiling element, to be subsequently reflected by the windshield 26 and redirected to a viewer to produce a virtual image. A light sensor 2 measures the intensity of the ambient light. If the intensity of the ambient light is dim, the sensor and optical system activate a display 1 to act as a source of light for producing the image. In this case, the display light travels through the polarizer and the LC matrix unchanged. (The LC matrix may be uniformly turned off so that the display light doesn't experience any change in polarization.) In any of embodiments in FIGS. 5A through 5L, a sensor may act to measure the ambient light, such that when the ambient light is too low to produce images, a backup light-such as a display, or backlight—may be turned on to provide the image content.

Figure 5B:
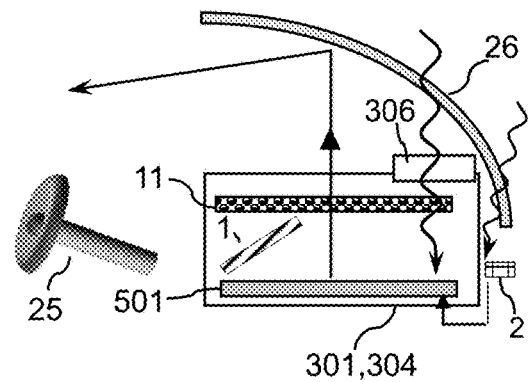

FIG. 5B depicts an embodiment in which ambient light enters the vehicle from the outside world through the windshield 26, enters the system through the entrance aperture optics 306, and through an angular profiling element 11, such as a directional film. A pixelated electrophoretic matrix 501 acts as the modulation matrix. Each pixel of an electrophoretic matrix has electrically charged pigment particles that can change the grayscale value of the pixel by applying a voltage. For grayscale electrophoretic elements, the pixel can become black or white. The electrophoretic pixels have display content programmed into the pigment values. The ambient light is then selectively reflected by the white pixels, travels back through the directional film and is reflected by the windshield to produce a virtual image for a viewer, who may be a driver behind a steering wheel 25. A display 1 acts as the source of for electrophoretic matrix in cases in which the intensity of ambient light is low—for example during nighttime—as detected by an ambient light sensor 2.

Figure 5C:
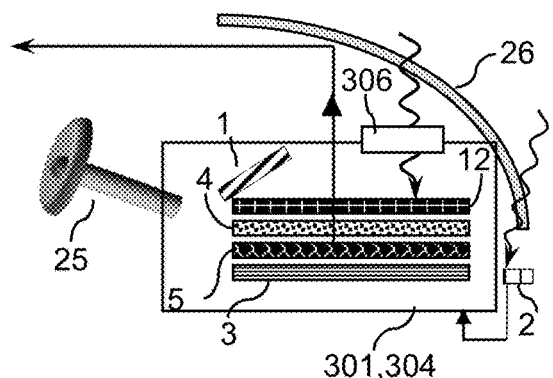

FIG. 5C depicts an embodiment in which ambient light going enters a vehicle through the windshield 26, enters the system through the entrance aperture optics 306, goes through an absorptive matrix 12 that modulates the intensity of the incoming ambient light according to a desired image. The modulated ambient light goes through a LC matrix 4. In some embodiments the LC matrix is OFF and does not contribute to the image formation. The light then strikes a phosphor matrix 5, which is activated to emit light according to the pattern imprinted on the light. The phosphor material emits light that travels back upward through the previous elements and is reflected by the windshield to generate a virtual image. In some embodiments, the phosphor light that is emitted and that forms a virtual image reaches a viewer without being reflected by the windshield. A light sensor 2 measures the intensity of the ambient light. In some embodiments, it controls the absorptive matrix 12 such that it smooths out fast-varying ambient light variations. For example, if the ambient light is rapidly varying between bright and dim, the electronic signal informs to absorptive matrix to be, respectively highly absorptive and less absorptive. In some embodiments, an optional mirror 3 behind the phosphor matrix reflects light emitted downward to contribute to the ultimate virtual image. In some embodiments, when the ambient light is dim or dark, a display 1 or other backlight is used as the light source for the image formation.

Figure 5D:
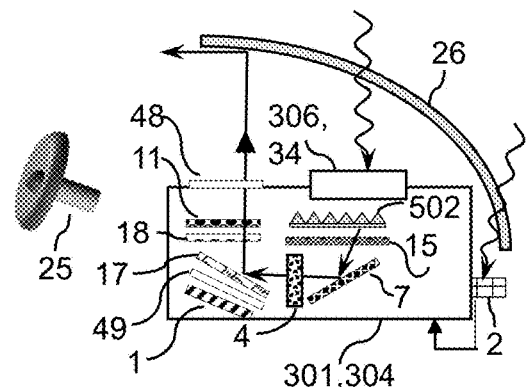

FIG. 5D depicts an embodiment in which ambient light going through the windshield 26 is passes through a nanocone array 502 to improve light collection. The collected ambient light goes through an antireflection element 15 to avoid ghost images on the windshield. The light is reflected by a PBS 7 that reflects polarized light, travels through an LC matrix 4 to produce a polarization-modulated light beam. The LC matrix 4 manipulates the polarization state of the light pixelwise—it rotates some of the pixels' polarization by 90 degrees and leaves the others untouched, corresponding to an image. The light the strikes a reflective polarizer 17, which reflects the pixels corresponding to the image and transmits the unwanted light. Reflected by a reflective polarizer 17. An ambient light sensor 2 captures the brightness of the ambient light. If the conditions are such that ambient light will not produce a sufficiently bright or steady image, the entrance aperture optics 306, engages an FSBM 34 to prevent the ambient light from entering the system. Further, an display 1 is turned on an polarized to pass through the reflective polarizer 17 to serve as the image source. In either case (of display or ambient light source), the light travels through a diffuser 18 and angular profiling element 11 to impact the angular profile of the image. The light then reflects from the windshield 26 and forms a virtual image. In some embodiments, an ambient light suppressor 48 further mitigates stray light. In some embodiments, a display with pre-cavity optics 49 is used to impact the profile of the light upon emission from the display.

Figure 5E:
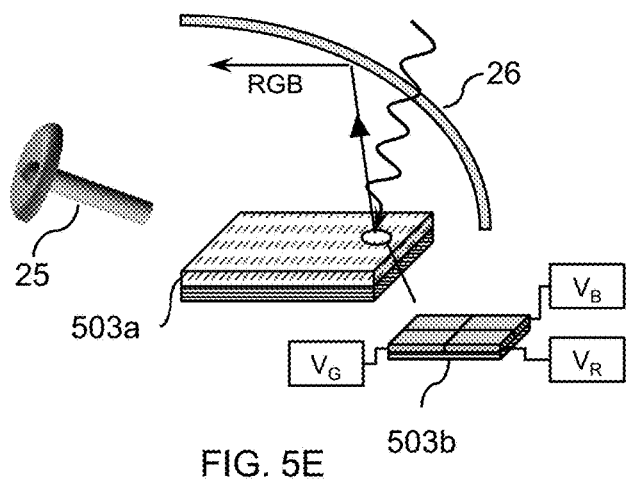

FIG. 5E depicts an embodiment in which the colors of the ambient light going through the windshield 26 are manipulated with an electro-wetting display matrix 503a, which comprises individual pixels 503b that modulate the color channels (e.g., RGB) of the ambient light. The modulation of the color channels is realized via different voltages applied to the individual sub-pixels, which are sensitive to one color channel. The manipulated color image is reflected back upward, then reflected by the windshield 26 to generate a virtual image, which may be HUD image. Electrowetting pixels rely on microfluidics between immiscible fluids, such as oil and water. In some embodiments, a pixel comprises an oil layer, a water layer, a transparent electrode, and a substrate. The oil is colored. For example, a red pixel corresponds to red oil, blue pixel to blue oil, etc. When there is no voltage applied, the oil covers the pixel surface and reflects the desired color, corresponding to its own. When a voltage is applied, the oil is shifted to one corner or edge of the pixel, letting light through. By addressing the electrodes such that the voltage pattern corresponds to a display content, the electrowetting imprints the display content onto the ambient light to reflect an image. The shape of the fluids depends on the surface tension and on the voltage applied and can be arbitrarily engineered. In some embodiments, the substrate is absorptive.

Figure 5F:
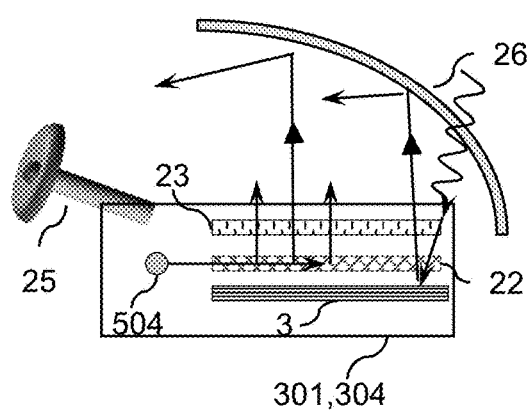

FIG. 5F depicts an embodiment in which ambient light going through the windshield 26 is modulated by an SLM 23. In this embodiment, the SLM is a transmissive SLM that modulates the amplitude of the light. The light passes through a waveguide 22, is reflected by a mirror, and retraces its path to be reflected by a windshield 26 to form a virtual image for a viewer. In some embodiments, during low-ambient light scenarios, a backlight 504 emits light into the waveguide 22, which is designed to couple light only at the wavelengths emitted by the backlight. For example, in some embodiments, the backlight emits red, blue, and green light of a relatively narrow bandwidth compared to sunlight. This light is coupled to waveguide and spreads outward, emitted upward, where it is modulated by the SLM 23 and produces a virtual image after reflection by the windshield. In some embodiments, the light exits directly to the viewer without interacting with the windshield.

Figure 5G:
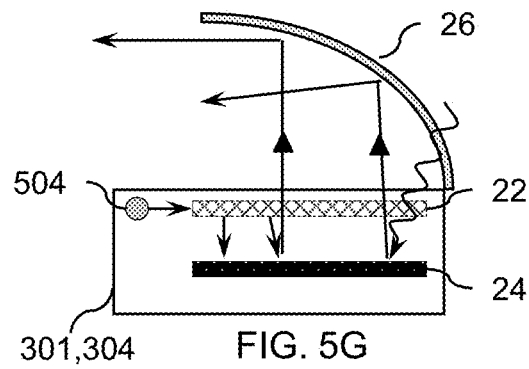

FIG. 5G depicts a variant of embodiment in FIG. 5F in which ambient light going through the windshield 26 is modulated by DMD 24, which sends the light back to the windshield 26 to generate a virtual image, which may be HUD image. Backlight source 504 is coupled into a light waveguide 22, which sends light to the DMD 24; the light is then reflected, and the zero-order diffracted light strikes the windshield to create a virtual image for a viewer. In some embodiments, both the backlight and the ambient light contribute to the image simultaneously. In some embodiments, only one or the other contributes.

Figure 5H:
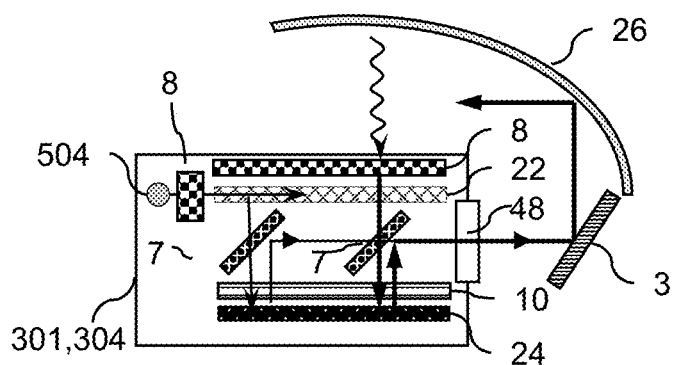

FIG. 5H depicts an embodiment in which ambient light going through the windshield 26 goes through absorptive polarizer 8 that polarizes the transmitted light. The transmitted ambient light travels through a waveguide 22, which is designed to be mostly transparent throughout the bandwidth of the ambient light, except possibly at some narrow-band regions around predetermined colors. The transmitted light is polarized to be reflected by a PBS 7. It then becomes circularly polarized by a QWP 10 and is modulated by a DMD 24, which acts as the modulation matrix. Upon a second pass through the QWP 10, the light is polarized such that it is reflected by the PBS 7 and directed out of the optical system 301 through an ambient light suppressor 48, reflected by a mirror 3, reflected by a windshield 26, and forms a virtual mirror. In low-ambient-light settings, a backlight source 504 is polarized by an absorptive polarizer 8 and is coupled into a light waveguide 22, which outcouples the light downward to follow the same path as the ambient light transmitted through it.

Figure 5I:
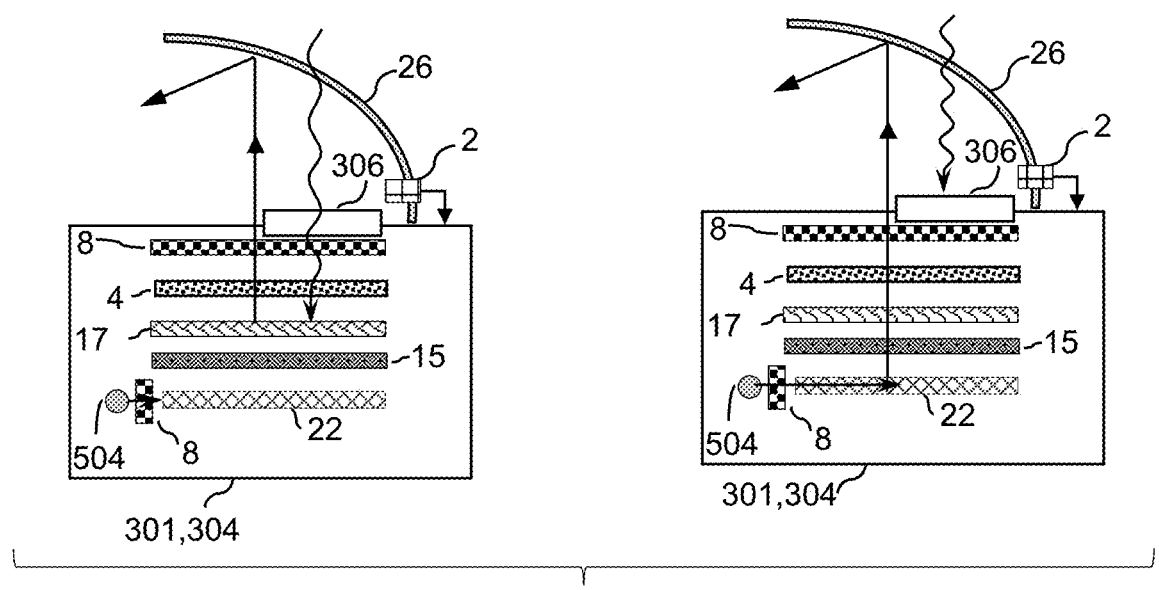

FIG. 5I depicts an embodiment in which ambient light going through the windshield 26 enters an optical system 301 and sunlight modulating panel 304 through entrance aperture optics 306. The light goes through an absorptive polarizer 8, which passes a certain polarization state. The light then is transmitted by an LC matrix 4 that polarization modulates the light according to a desired image content. It manipulates the polarization state of the light, which is reflected by reflective polarizer 17 back through the LC matrix 4 and absorptive polarizer 8. It is reflected by a windshield 26 and forms a virtual image.

An ambient light sensor 2 measures the amount of ambient light. In some embodiments, it is integrated in the windshield of the vehicle or is mounted on an external surface. When the ambient light is low, the sensor indicates through an electronic signal to close the entrance aperture optics to prevent ambient light from entering the system. It also directs a backlight source 504 to emit light, which passes through an absorptive polarizer 8, is coupled to a waveguide 22, is outcoupled through an AR element 15, passes through the reflective polarizer 17, is modulated by the LC matrix 4, and passes through the top absorptive polarizer 8 to be reflected by the windshield an form an image. Note that in this embodiment, the polarized backlight is orthogonal to the polarizer ambient light, such that the former is transmitted by the reflective polarizer and the second dis reflected by it. Because of this, the LC matrix may have to switch which pixels are modulated to provide the appropriate content.

Figure 5J:
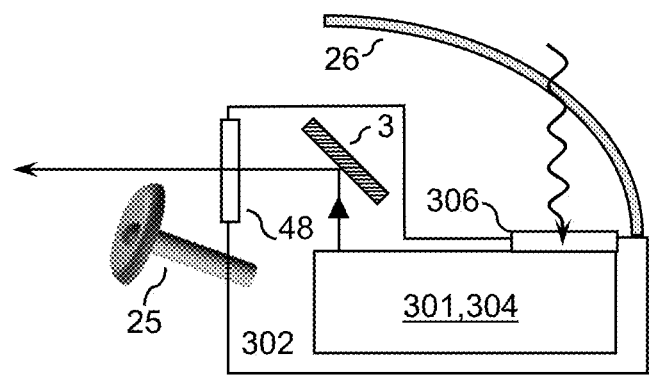

In FIG. 5J, ambient light enters through the windshield and enters a housing 302 that contains an optical system 301 and sunlight modulating panel 304. This embodiment represents any of the embodiments of FIGS. 5A through 5I. The light exits the optical system and is reflected by a mirror 3 through an ambient light suppressor 48 to form a virtual image for a viewer, who may be a driver behind a steering wheel 25. In this case, the light is not reflected by the windshield before forming an image. In some embodiments, the virtual image is part of an instrument cluster.

Figure 5K:
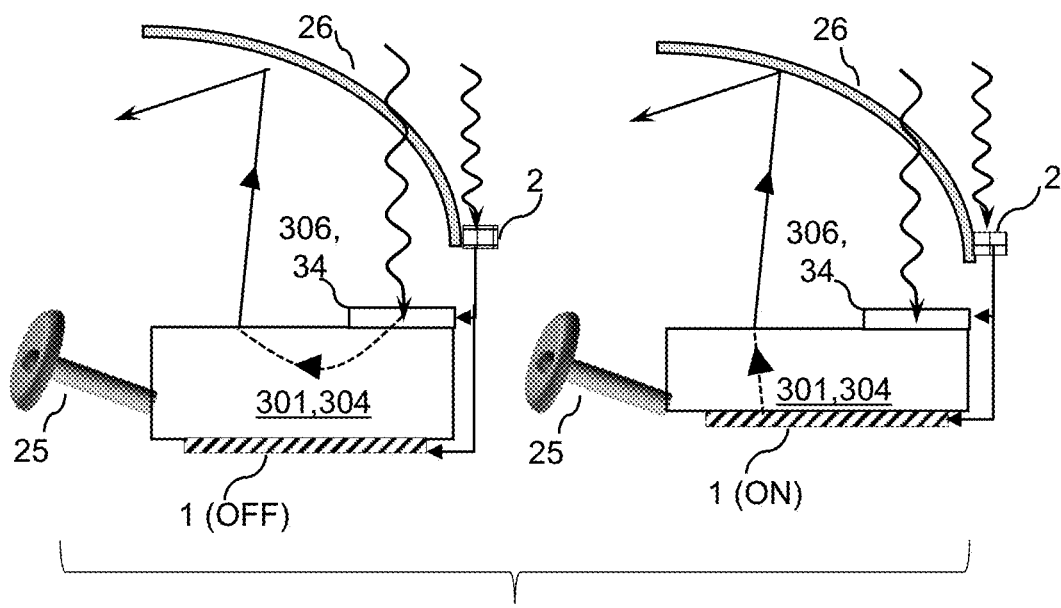

FIG. 5K shows the general principle of switching between sunlight-driven, or ambient-light, image sources and integrated backlights or displays. When the ambient light is bright enough, as registered by a light sensor 2, light entering the vehicle through a windshield 26 enters the optical system 301 and sunlight modulating panel 304 through the entrance aperture optics 304, which may include a FSBM 34, which is configured to let light pass. The light is imprinted with an image in the system and exits the display system to form a virtual image. In some embodiments, the light is reflected by the windshield before heading to the viewer. The display is OFF. When the sensor records a low ambient light reading, it switches the FSBM 34 to prevent the ambient light from entering and turns the display 1 ON. The display light then travels through the system to exit and form a virtual system. In some embodiments, the FSBM is a simple shutter or iris that can open or close to determine whether or not ambient light enters the system.

In some embodiments pertaining to FIGS. 5A through 5K, computational methods may perform distortion compensation or have a physical distortion compensation element before exiting the system. For example, an affine transform may be computationally performed on the image content to counter a resulting barrel or pincushion distortion after reflection by a curved reflector. In some embodiments, a physical partially transparent element by produce the affine transform with a certain surface shape.

Figure 6:
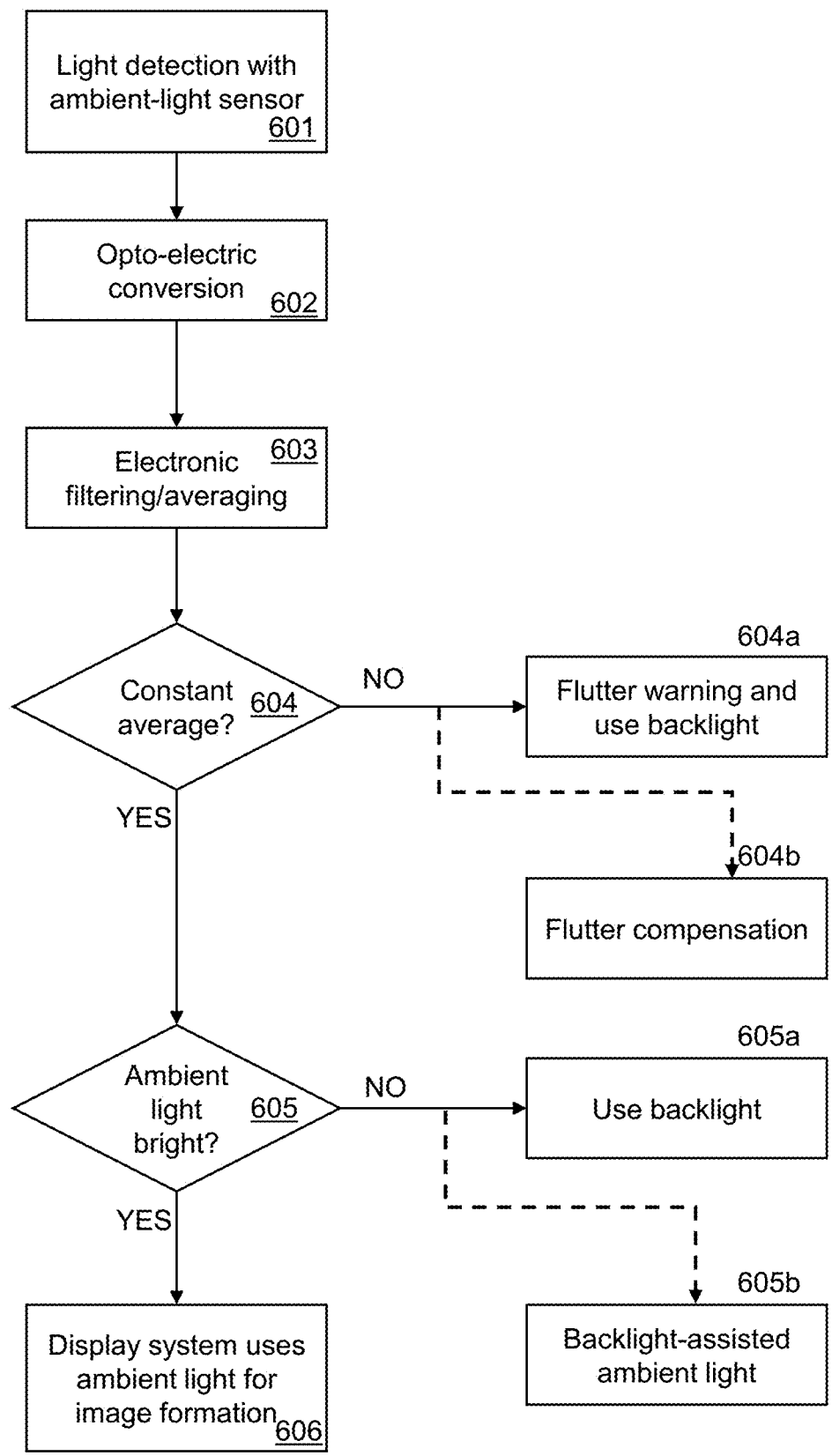
FIG. 6 depicts a flowchart for identifying the conditions under which the virtual display system uses the ambient light sources of FIGS. 5A through 5I.

FIG. 6 shows a block diagram or flow chart describing different ambient light manipulation processes based on the desired output. The process starts with light detection 601 with an ambient light sensor to capture the intensity and/or direction of the incoming ambient light. The collected ambient light goes through an opto-electric conversion step 602. In some embodiments, the electronic signal produced is proportional to the incident intensity. This electronic signal output goes through an electronic filtering/averaging step 603. This step produces a smoothed version of the raw electronic signal. In some embodiments, this is produced via windowed time average. In some embodiments, this is produced using a proportional-integral-derivative (PID) filter. The output from step 603 is measured for constant intensity. In this step, the actual filtered electronic output is compared to a built-in threshold. For example, this comparison step, in some embodiments, compares the refresh rate of a standard display, such as 30 Hz, 60 Hz, 120 Hz, or 144 Hz. In some embodiments, it is compared to a time scale corresponding to the human vision system. If the average is constant compared to one or several of these thresholds, it is measured for intensity level in step 605. In this step, the average intensity may be computed over a large time window and compared to a standard threshold, such as a typical brightness of a display panel, or it may be a function of the human vision system sensitivity. In this step, the flowchart decides whether the ambient light is bright enough to form a virtual image in step 606.

If intensity average, as calculated in step 603, is not constant, the system raises a flutter warning and uses a backlight 604a. This may occur for example, in vehicle motion where there are canopy effects, such as driving along a round covered and surrounded by trees. Is some embodiments, the ambient light sensor records spatial information about the distribution of light and the backlight may be programmed to illuminate only those portions where flutter occurs, and allowing the ambient light to produce images in the other regions of the optical system. In some embodiments, the flutter warning may trigger other electrically activated elements to help smooth out the light. After the brightness or intensity level is calculated, if the ambient light is not bright enough, the system uses backlight 605a. This may be the case in low lighting conditions, such as nighttime driving. In some embodiments, the backlight simply assists, or adds to, the incoming ambient light 605b.

The process of FIG. 6 allows the ambient light sensor to measure the ambient light and have a computer system decide whether the ambient light is sufficient to use as the light source for the display content, or whether it is insufficient and an integrated backlight or LCD display, or other display pane, is necessary. In some embodiments, the optical system or sunlight-activated system is modulated based on the signal from the ambient light sensor to compensate for spatial or temporal variations, e.g., by using diffusive time delays for smoothing out the lighting.

Figure 7A:
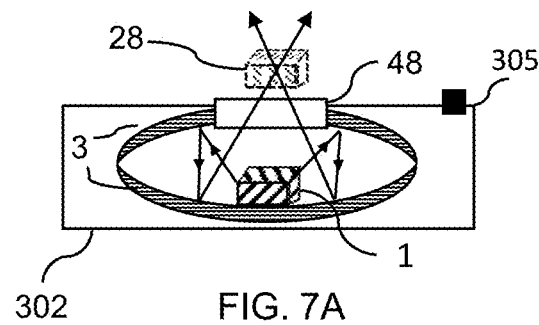
FIGS. 7A through 7N depict a set of embodiments that use display systems to produce hovering real images that a viewer can interact with using a gesture camera.
Figure 7B:
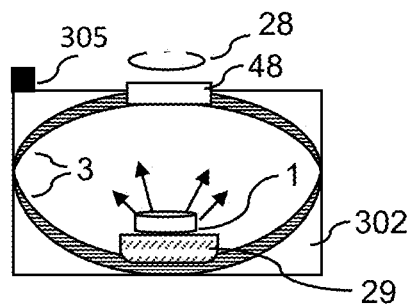
Figure 7C:
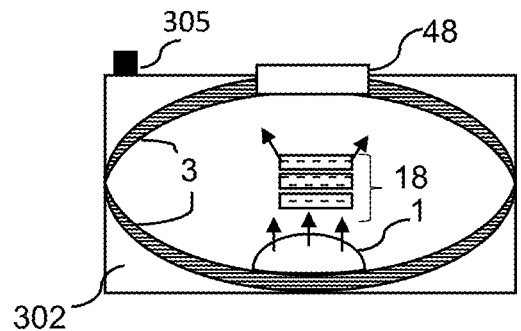
Figure 7D:
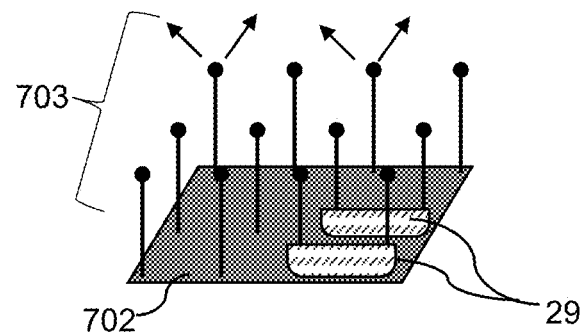
Figure 7K:
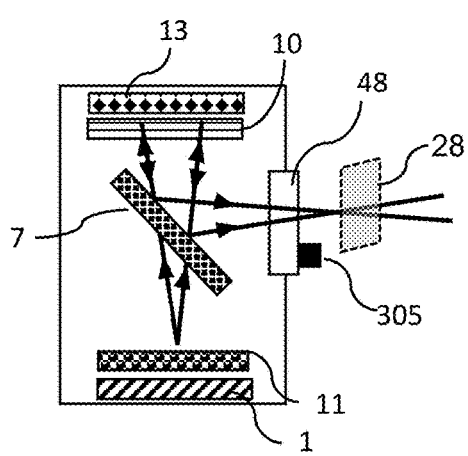
Figure 7L:
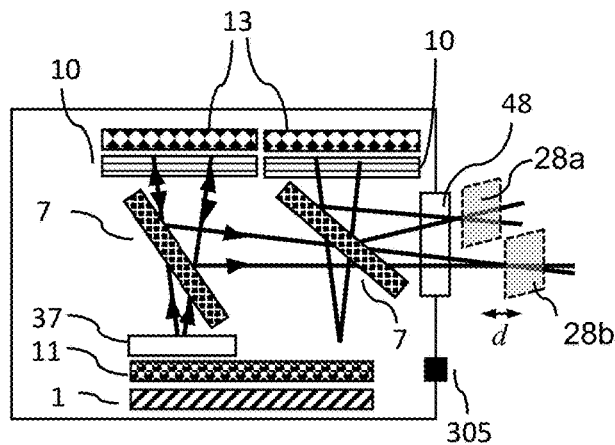
Figure 7M:
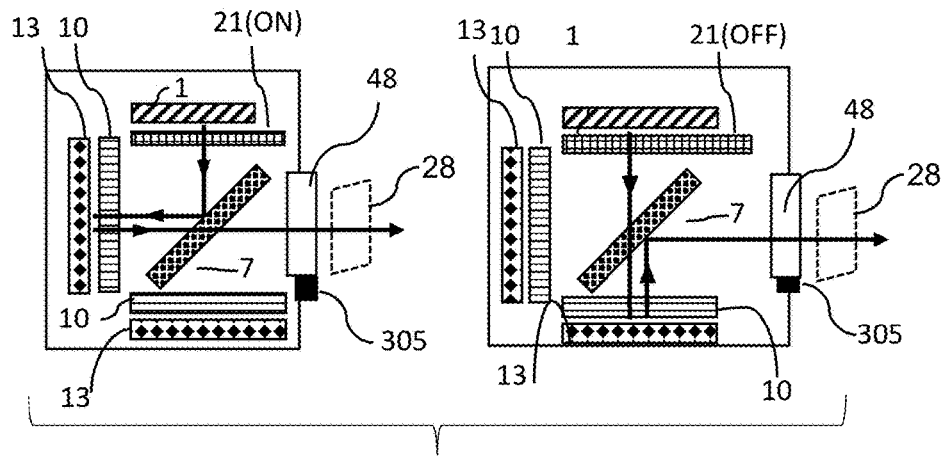
Figure 7N:
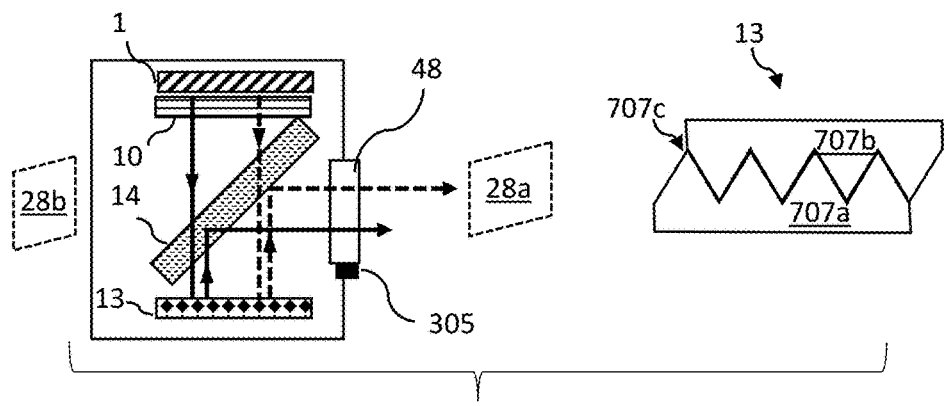

FIGS. 7A through 7N depict a set of embodiments that produce virtual images that are closer to a viewer than the physical components of the display system, i.e., hovering real images. All these embodiments may include a gesture camera, such that a viewer can interact with the virtual images. All these embodiments may have an ambient light suppressor to prevent external, ambient, or environmental light from entering the system. Therefore, whenever the display lights are off, the ambient light suppressor looks dark. In this way, the ambient light suppressor provides ambient light suppression for the hovering images.

In FIG. 7A, a curved cavity with walls as mirrors 3 contains a display, which may be a display 1, which may be a volumetric display. The volumetric display, in some embodiments, is a moving light, such as an LED, or a plurality of moving LEDs. The motion is much faster than the response time of the eye so that the source is perceived as a continuous volume of light. The light fans out in all directions and bounces off various parts of the mirrors 3. The mirrors are shaped such that a point at or just above where the light exits are where a real image is formed, i.e., where the light focuses to a secondary image. This is referred to as a "hovering real image" or a "hovering image" in this disclosure. A person who is looking at that spot will see a virtual image 28. The cavity has an exit that is an ambient light suppressor 48 which prevents unwanted ambient light from entering the cavity and producing ghost images or stray light artifacts for the viewer. With the ambient light suppressor in place, when the volumetric display is turned off, no light exits the system for the viewer to see, i.e., it will look dark when viewing the cavity through the ambient light suppressor. A gesture sensor 305 captures gestures made by a viewer or passenger in a vehicle. That information may be used to change the volumetric display or the property of the vehicle itself.

FIG. 7B is another embodiment of a hovering image produced by cavity optics. Housing 302 contains a curved cavity walled with mirrors 3. The light source is display 1, which is a volumetric display, in this case is a diffuser fiber that is bent or curved into a desired shape. Light that is coupled into the diffusive fiber is emitted at all points along it. In some embodiments there are multiple fibers. In some embodiments, there is a mechanical actuator 29 to change the position or shape of the optical fiber(s), thus changing the configuration of the volumetric display light. The light proceeds as before: it bounces throughout the cavity forming a hovering image just above ambient light suppressor 48, such that a viewer sees a virtual image 28 in that location. A gesture sensor 305 captures gestures made by a viewer or passenger in a vehicle. That information may be used to change the volumetric display or the property of the vehicle itself.

FIG. 7C shows another embodiment of the same time, where the display 1 is a volumetric display, which is a collimated light source that passes through a set of diffusers 18. The diffusers spread the light out, such that it bounces throughout the cavity and forms a hovering image just above the ambient light suppressor 48. A gesture sensor 305 captures gestures made by a viewer or passenger in a vehicle. That information may be used to change the volumetric display or the property of the vehicle itself.

There are other types of volumetric display sources. For example, as shown in FIG. 7D, an array of optical fibers 703 can be attached to a base 702. The fibers may be cut to various lengths to create a volume of light. Optional mechanical actuators 29 may be used to change the shape or position of some or all the fibers.

In some embodiments, the volumetric display is a collimated display and a set LC diffusers, a rotational multilevel display, a micro-projector and a set of LC diffusers, or an optical fiber or a plurality of optical fibers that are shaped into a certain fixed patterns. In some embodiments, the light sources are embedded in a polarization dependent slab to create different images based on polarization of light.

FIG. 7E shows an embodiment in which the cavity consists of a set of beam splitters and display panels. Like the embodiment in FIG. 4A, the displays are segmented displays. Light from a bottom display 1 sends light upward through a set of semi reflectors, which is a set of PBSs 7 in some embodiments. The light then travels through an ambient light suppressor 48 to produce virtual images 28a that are deeper or farther from a viewer 303. A second display sends light downward to be reflected by the PBSs 7. They strike a QM 31 which is curved. The QM caused the polarization of the reflected light to be rotated by 90 degrees such that it passes through all the PBSs to be seen by the viewer 303. The curvature of the QM focuses the light to produce a real image just passed the ambient light suppressor 48, such that the viewer sees virtual images 28b located there, closer to him than the distance to the ambient light suppressor itself. The ambient light suppressor prevents unwanted light from entering the embodiment and therefore, the system is dark when the displays are off.

FIG. 7F shows a generalized embodiment related to that in FIG. 7E. A display system 704, which comprises light sources, optical systems and components, and/or FECs, generates image content. The light is reflected by an ambient light suppressor 48, which may contain a polarization dependent beam splitter instead of an absorptive polarizer. The reflected light is reflected by a curved QM 31, which focuses the light through the ambient light suppressor to produce hovering real images. The distance to the right of the ambient light suppressor 48 where the image is formed depends on the curvature (i.e., on the focal length of the QM). A viewer looking toward the ambient light suppressor will see a virtual image 28 at the position of the real image.

FIG. 7G shows an embodiment that produces hovering real images using a catadioptric system. Light from a display system 705 passes through a curved beam splitter 14 and is reflected by a curved mirror 3 back toward the beam splitter. The beam splitter then reflects the light, e.g., nearby to, or through a gap in, steering wheel 25. The light passes through an ambient light suppressor 48 and produces a hovering real image, which a viewer may interact with through a gesture camera. In some embodiments, the gesture camera and/or the image can be impacted by the rotational of the wheel.

In FIG. 7H, a display system sends light through a first mirror 3 and a second mirror 3 through an ambient light suppressor 48. The resulting image may be a hovering real image (if the mirrors are curved) or a deeper virtual image (if they are flat). The images may be near to a steering wheel 25.

FIG. 7I is an example embodiment of when a steering wheel 25 with display systems would look like in practice.

Gesture camera 305 is fixed to the steering wheel, and an ambient light suppressor 48 is integrated in it. Virtual images 28 appear at various positions around the wheel. Light/camera arrays 705, and microphone array 706, are fastened around the wheel. In some embodiments, the lights and cameras record the viewer's position or eye gaze and input that into the computational compensation of the display system to optimize the focal plane or perspective of the virtual images.

FIG. 7K shows an embodiment to produce hovering real images using retroreflective elements. A display 1 emits light through an angular profiling element 11, which may be a directional film. It is polarized to pass through a PBS 7, and it is subsequently converted to circular polarization by a QWP 10. The light is then reflected by a retroreflector 13, which converts the diverging light rays into converging light rays, i.e., each ray is reflected along the path on which is struck the retroreflector. After a second pass through the QWP, the light is polarized to be reflected by the PBS 7 and exits through an ambient light suppressor 48. The converging light forms a hovering real image just beyond, such that a viewer will see a virtual image 28 there. A gesture camera 305 captures gestures of a viewer, and eh information is used to impact the image.

In FIG. 7L, multiple retroreflectors produce multifocal hovering real images. Light is emitted by display 1 which is a segmented display. Each portion passes through a respective PBS 7 through a QWP 10 and reflected by a retroreflector 13 to convert the diverging light into converging light. The double-pass through the QWP 10 rotates the polarization of the light to be reflected by the PBSs and exits through the ambient light suppressor forming hovering real images. In some embodiments, the optical path of one segment of light is different than that of the other, such that two virtual images 28a. 28b are formed at two different focal planes for a multifocal image. The separation distance d can be further varied by inserting an EORS 37 in either or both beam paths. In some embodiments, the PBSs are not parallel, such that the hovering images are shifted relative to each other.

FIG. 7M shows an embodiment that uses switchable elements with retroreflectors. A display emits light through an LC layer 21 which is ON. The light is polarized to be reflected by a PBS 7, passes through a QWP 10, is reflected by a retroreflector on the lift 13, passes through the same QWP 10, and is polarized to pass through the PBS, through an ambient light suppressor to form a hovering real image. When the LC layer 21 is OFF, the light is polarized to travel through the PBS 7, through the bottom QWP 10 and reflected by the bottom retroreflector 14. The reflected light passes again through the bottom QWP and is reflected by the PBS, through the ambient light suppressor 48. A gesture camera allows a viewer to interact with virtual image 28. In some embodiments, the switching of the LC layer in synchronized with time-varying image content on the display. In some embodiments, the optical path length of the image differs depending on whether the LC layer is ON or OFF to produce a dynamically variable focal plane, or position of the image.

FIG. 7N shows an embodiment in which the retroreflector is birefringent, such that a first polarization experiences it as a retroreflector, and an orthogonal polarization experiences it as a normal (semi)-reflector or partial mirror. In some embodiments, this is produced by sandwiching an isotropic slab 707a whose surface is retroreflector (e.g., a corner cube shape) against an anisotropic slab 707b of complementary surface. For one polarization, the two indices are identical, and the corner-cube interface 707c is invisible, such that the light experiences a conventional mirror, and produces a deeper virtual image 28b. For The orthogonal polarization, the two indices differ, and the corner-cube interface acts as a retroreflective surface to produce a hovering real image for a user to see a virtual image 28a close.

Light from display 1, passes through a QWP 10 to produce circularly polarized light. This light comprises equal amounts of vertically and horizontally polarized light or, equivalently, s- and p-polarized light. The light travels through a beam splitter 14 and strikes the birefringent retroreflector 13. One polarization experiences a normal reflection, is reflected by the beam splitter, and passes through the ambient light suppressor to produce a virtual image 28 that is farther from a user. The orthogonal polarization, experiences the retroreflection action, produces converging light rays, and is reflected by the beam splitter 14 and through the ambient light suppressor 48 to produce a hovering real image, close to a viewer, who interacts with it through a gesture camera.

FIG. 8A through 8D depicts some applications using hovering buttons inside the cockpit or cabin of the vehicle. FIG. 8A depicts an embodiment in which a display system 704 is placed near the rear mirror 708. A hovering image 28 offering different options to viewer 303 is shown around the rear mirror. Gesture camera 305 interprets the gesture of viewer 303 and proceeds to activate the option selected by viewer 303 based on a specific acknowledgement gesture. Gesture camera 305 can be, but not limited to, an eye tracking device.

FIG. 8B depicts an embodiment in which a display system 704 shows several hovering buttons 28 around the steering wheel offering different options to the user. A gesture camera 305 interprets the gestures of the user and activates the option chosen by the user based on a specific acknowledgement gesture.

FIG. 8C depicts an embodiment in which a display system 704 located on the side door of viewer and driver 303 shows a hovering button 28. A gesture camera 305 interprets the gesture of viewer and driver 305 and activates the option selected by the viewer.

FIG. 8D depicts an extension of embodiment in FIG. 8C in which a set of twin display systems 704 are placed at either door (driver and passenger), showing a set of hovering buttons, one for the driver 303 and another one for the side passenger303. A pair of gesture cameras 305 interpret the gestures of both the driver and passenger individual and activate the options selected by the driver and passenger independently.

Figure 9A:
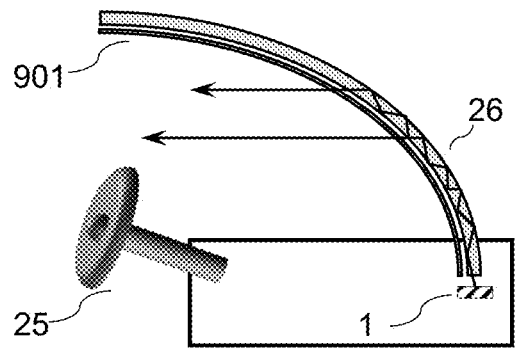
FIGS. 9A through 9C illustrate certain embodiments in which a portion of the optical system is itself integrated into a windshield of a vehicle.
Figure 9B:
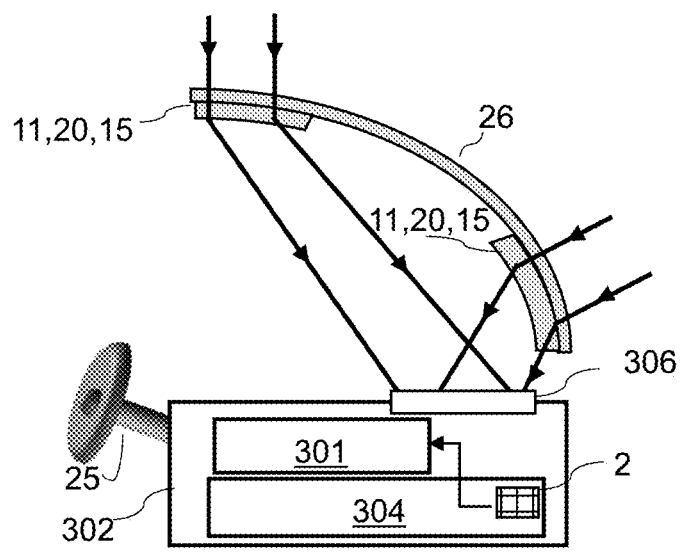
Figure 9C:
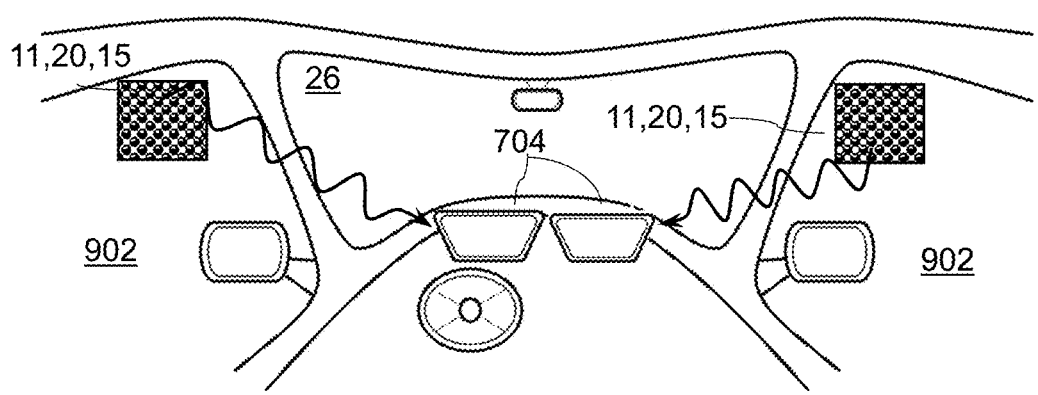

FIG. 9A through 9C shows embodiments in which the windshield is an engineered component intrinsic to the optical system. FIG. 9A depicts an embodiment in which windshield 26 acts as a waveguide. Display 1 sends light into the edge of the windshield, which travels along the windshield 26. Outcoupling layer 901 allows light from within windshield to leak out by slightly modulating the index of refraction of such outcoupling layer 901. In some embodiments, the outcoupling layer is a surface grating.

FIG. 9B depicts an embodiment in which the windshield is integrated with optical elements to collect more light for a sunlight-activated display. The elements comprise an angular profiling element 11, which may be a directional film, a diffractive optic element 20, and an antireflection element 15, and they each redirect ambient light to an aperture optics 306 as the input window in housing 302. In some embodiments, the DOE or directional film is a Fresnel lens to help concentrate the light into the entrance aperture optics. One ambient light collector set is placed toward the roof area whereas the other ambient light collector is placed on the bottom part of windshield 26. Inside housing 302, light sensor 2 measures the intensity and time variation of the ambient light and controls an optical system 301 and sunlight modulating panel 304. In some embodiments, the light collection layers are on different glass parts of the vehicle, such as other windows, sunroof apertures, or rear windows.

FIG. 9C depicts an embodiment in which twin ambient light collector sets comprising an angular profiling element 11, a diffractive optic element 20, and an antireflection element 15 each redirect ambient light to display systems 704, one for the driver and another one for the passenger.

It is also possible to integrate the embodiments of this invention with other optical elements, such as parallax barriers, polarization shutters, or lenticular arrays to send different images to different eyes. In some embodiments, this is aided with an eye tracking module, and in some embodiments, the other optical elements are worn as a headset. These systems then may produce both monocular depth cues and stereoscopic depth cues to trigger accommodation and vergence binocular vision.

Although the invention has been explained in relation to its preferred embodiments, it is to be understood that many other modifications and variations can be made without departing from the spirit and scope of the invention as hereinafter claimed.

In this document, the terms "machine readable medium," "computer readable medium," and similar terms are used to refer to non-transitory mediums, volatile or non-volatile, that store data and/or instructions that cause a machine to operate in a specific fashion. Common forms of machine-readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skills in the art after reading this document, the illustrated embodiments and their various alternatives can be implemented without confinement to the illustrated examples. For example, block diagrams and their accompanying description should not be constructed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in several ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain operations or processes may be distributed among computer systems or computers processors, not only residing within a single machine, but deployed across a number of computational resources.

As used herein, the term "or" may be constructed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be constructed as open ended as opposed to limiting. Adjectives such as "conventional," "traditional," "normal," "standard," "known," and terms of similar meaning should not be constructed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The invention claimed is:

1. A dual-purpose visualization system comprising:
   a housing having a first image aperture and a second image aperture;
   a display secured to the housing and to generate light;
   a plurality of optical elements secured within the housing and oriented to direct a first portion of the light through the first image aperture to form a first virtual image, and a second portion of the light through the second image aperture to form a second virtual image; and
   a reflector external to the housing to direct the first portion of light to at least partially overlap with the second portion of light in a region external to the housing,
   wherein the first and second virtual images are simultaneously visible in a continuous headbox that spans at least 10 cm laterally and possess a monocular depth that is different from a distance between the continuous headbox and the display.

2. The dual-purpose visualization system of claim 1, wherein the reflector is a windshield of a vehicle, and the continuous headbox encompasses a position of a person in the vehicle.

3. The dual-purpose visualization system of claim 1, wherein either the first or the second virtual image is a multifocal image.

4. The dual-purpose visualization system of claim 1, wherein a surface of the display is oriented at an angle relative to a focal plane of the second virtual image.

5. The dual-purpose visualization system of claim 1, wherein the reflector is a windshield of a vehicle, and the display shows a distorted first virtual image to pre-compensate a distortion produced by a reflection of the first virtual image from the windshield.

6. The dual-purpose visualization system of claim 1, where the display comprises a plurality of displays secured to the housing.

7. The dual-purpose visualization system of claim 1, wherein the display is a segmented display, and a lateral dimension of either of the first virtual image is larger than a lateral dimension of the first aperture.

8. The dual-purpose visualization system of claim 1, wherein the first virtual image is at least a part of an image corresponding to an instrument cluster, an entertainment system, or a head-up display.

9. The dual-purpose visualization system of claim 1, further comprising an ambient light suppressor to eliminate stray light when viewing the first and second virtual images.

10. The dual-purpose visualization system of claim 9, wherein the ambient light suppressor comprises a quarter-wave plate and a polarizer.

11. The dual-purpose visualization system of claim 10, wherein the ambient light suppressor further comprises an antireflection element.

12. The dual-purpose visualization system of claim 1, wherein the optical elements are polarization dependent, and the system further comprises a plurality of wave plates disposed along an optical path of the light within the visualization system.

13. A dual-purpose visualization system comprising:
a housing having a first image aperture and a second image aperture;
a display secured to the housing to generate light; and
a plurality of optical elements secured within the housing and oriented to direct a first portion of the light through the first image aperture to form a first virtual image in a first headbox, and a second portion of the light through the second image aperture to form a second virtual image in a second headbox,
wherein
the first headbox spans at least 10 cm laterally,
the second headbox spans at least 10 cm laterally, and
the first and second virtual images possess a monocular depth that is different from a distance between the display and the respective first or second headbox.

14. The dual-purpose visualization system of claim 13, further comprising a reflector external to the housing to direct the first portion of the light such that the first headbox and the second headbox at least partially overlap.

15. The visualization system of claim 14, wherein the reflector is a windshield of a vehicle, and the first headbox and the second headbox simultaneously encompass a position of a person in the vehicle.

16. The dual-purpose visualization system of claim 13, further comprising an ambient light suppressor, the ambient light suppressor including an antireflection element to eliminate stray light when the first or second virtual images are viewed.

17. The dual-purpose visualization system of claim 16, wherein a subset of the plurality of optical elements forms a catadioptric system such that a monocular depth of the first virtual image is smaller than a distance between a viewer and the ambient light suppressor.

18. The dual-purpose visualization system of claim 13, wherein the plurality of optical elements are polarization dependent, and the system further comprises a plurality of quarter-wave plates disposed along an optical path of the light within the visualization system.

19. The dual-purpose visualization system of claim 13, wherein the first virtual image is a multifocal image.

20. The dual-purpose visualization system of claim 13, wherein the first virtual image is at least a part of an image corresponding to an instrument cluster, an entertainment system, or a head-up display.

21. A dual-purpose visualization system comprising:
a housing having a first image aperture and a second image aperture;
a plurality of displays secured to the housing to generate light;
a plurality of optical elements secured within the housing and oriented to direct a first portion of the light through the first image aperture to form a first virtual image, and a second portion of the light through the second image aperture to form a second virtual image; and
a reflector external to the housing to direct light corresponding to the first portion of the light to at least partially overlap with the second portion of the light in a region external to the housing,
wherein the first and second virtual images are simultaneously visible in a continuous headbox that spans at least 10 cm laterally and possess a monocular depth that is different from a distance between the continuous headbox and the display.

22. The dual-purpose visualization system of claim 21, further comprising an ambient light suppressor, the ambient light suppressor including an antireflection element.

23. The dual-purpose visualization system of claim 21, wherein the plurality of optical elements are polarization dependent, and the system further comprises a plurality of wave plates disposed along an optical path of the light.

24. The dual-purpose visualization system of claim 21, wherein the reflector is a windshield of a vehicle, and the continuous headbox encompasses a position of a person in the vehicle.

25. The dual-purpose visualization system of claim 21, wherein the first virtual image is a multifocal image.

26. The dual-purpose visualization system of claim 21, wherein the first virtual image is at least a part of an image corresponding to an instrument cluster, an entertainment system, or a head-up display.

* * * * *